United States Patent
Pabbaraja et al.

(10) Patent No.: US 12,459,893 B2
(45) Date of Patent: Nov. 4, 2025

(54) INDOLE-YNONE MEDIATED BENZOANNULATION PROCESS FOR THE PREPARATION OF CARBAZOLES, CARBAZOMYCIN A, CALOTHRIXIN B AND STAUROSPORINONE

(71) Applicant: COUNCIL FOR SCIENTIFIC & INDUSTRIAL RESEARCH, New Delhi (IN)

(72) Inventors: Srihari Pabbaraja, Hyderabad (IN); Goverdhan Mehta, Hyderabad (IN); Ramesh Samineni, Hyderabad (IN); Shweta Singh, Hyderabad (IN)

(73) Assignee: Council of Scientific & Industrial Research, New Delhi (IN)

( * ) Notice: Subject to any disclaimer, the term of this patent is extended or adjusted under 35 U.S.C. 154(b) by 1003 days.

(21) Appl. No.: 17/442,828

(22) PCT Filed: Mar. 24, 2020

(86) PCT No.: PCT/IN2020/050275
§ 371 (c)(1),
(2) Date: Sep. 24, 2021

(87) PCT Pub. No.: WO2020/202180
PCT Pub. Date: Oct. 8, 2020

(65) Prior Publication Data
US 2022/0169609 A1    Jun. 2, 2022

(30) Foreign Application Priority Data

Mar. 29, 2019   (IN) .............................. 201911012434

(51) Int. Cl.
*C07D 209/88*   (2006.01)
(52) U.S. Cl.
CPC ................................. *C07D 209/88* (2013.01)
(58) Field of Classification Search
CPC .................................................. C07D 209/88
See application file for complete search history.

(56) References Cited

U.S. PATENT DOCUMENTS

| | | | |
|---|---|---|---|
| 2,328,588 | A | 9/1943 | von Glahn et al. |
| 2,921,942 | A | 1/1960 | Grotta |

(Continued)

OTHER PUBLICATIONS

PubChem CID 104251, National Center for Biotechnology Information. PubChem Compound Summary for CID 104251, 4-Hydroxycarbazole. https://pubchem.ncbi.nlm.nih.gov/compound/4-Hydroxycarbazole. Accessed Aug. 22, 2024, create date Aug. 8, 2005. (Year: 2005).*

(Continued)

*Primary Examiner* — Laura L Stockton
(74) *Attorney, Agent, or Firm* — Norton Rose Fulbright US LLP

(57) ABSTRACT

The present invention relates to carbazoles of general formula (I), and process for the preparation thereof: wherein '$R_1$' is H, C1-C6 alkyl, benzyl, or allyl; $R_2$ is H, C1-C6 alkyl, cyclopropyl, phenyl, aryl, heteroaryl, or $NO_2$; $R_3$ is H, C1-C6 alkyl, cyclopropyl, phenyl aryl, heteroaryl, 4-methoxy phenyl, 4-ethyl phenyl, 2-methyl phenyl, or 2-Fluoro phenyl; $R_4$ is H, benzoyl, —$CO_2Et$, —CHO, Br, or —OMe; $R_5$ is OH, OMOM, OMe, CN, or OTf; $R_6$ is H, or O-alkyl; and $R_3$-$R_4$ is —CHNCH2CH2-. This invention also relates to the process for the preparation of carbazomycin A of Formula (1), calothrixin B of Formula (2) and staurosporinone of Formula (3) involving carbazoles of general formula (I) as an intermediate.

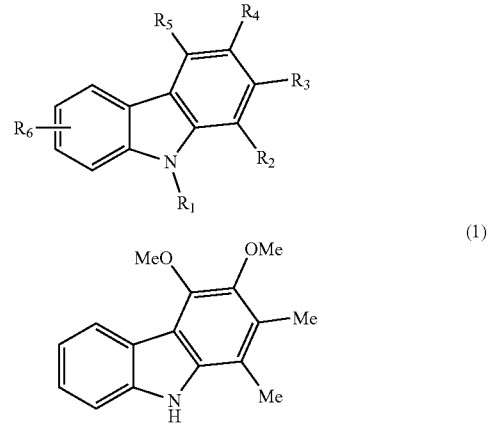

carbazomycin A (1)

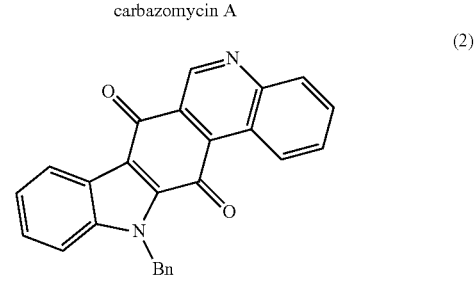

calothrixin B (2)

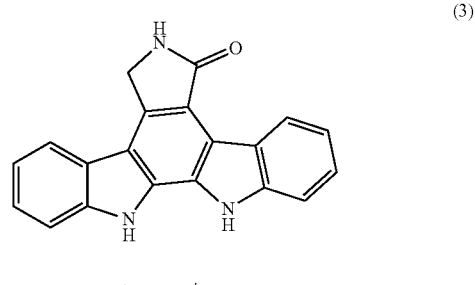

staurosporinone (3)

1 Claim, No Drawings

(56) References Cited

U.S. PATENT DOCUMENTS

| | | | |
|---|---|---|---|
| 4,297,426 | A | 10/1981 | Sakai et al. |
| 5,093,330 | A | 3/1992 | Caravatti et al. |
| 9,911,925 | B2 | 3/2018 | Lee et al. |
| 2007/0197797 | A1 | 8/2007 | Harrington |
| 2015/0342927 | A1 | 12/2015 | Tucker et al. |

OTHER PUBLICATIONS

Kato et al., Journal of Antibiotics (1993), 46(12), pp. 1859-1865. (Year: 1993).*
PubChem CID 12655269, National Center for Biotechnology Information. PubChem Compound Summary for CID 12655269, 4-methoxy-9H-carbazole. https://pubchem.ncbi.nlm.nih.gov/compound/4-methoxy-9H-carbazole. Accessed Feb. 28, 2025, create Feb. 8, 2007. (Year: 2007).*
PubChem CID 59706615, National Center for Biotechnology Information. PubChem Compound Summary for CID 59706615, 1-methyl-9H-carbazol-4-ol. https://pubchem.ncbi.nlm.nih.gov/compound/1-methyl-9H-carbazol-4-ol. Accessed Feb. 28, 2025, create date Aug. 20, 2012. (Year: 2012).*
PubChem CID 69634144, National Center for Biotechnology Information. PubChem Compound Summary for CID 69634144, 4,5-dimethoxy-9H-carbazole. https://pubchem.ncbi.nlm.nih.gov/compound/4_5-dimethoxy-9H-carbazole. Accessed Feb. 28, 2025, create date Dec. 1, 2012. (Year: 2012).*
PubChem CID 104251, National Center for Biotechnology Information. PubChem Compound Summary for CID 104251, 4-Hydroxycarbazole. https://pubchem.ncbi.nlm.nih.gov/compound/4-Hydroxycarbazole. Accessed Feb. 28, 2025, create date Aug. 8, 2005. (Year: 2005).*
PubChem CID 91664822, National Center for Biotechnology Information. PubChem Compound Summary for CID 91664822, 1,2-dimethyl-9H-carbazol-4-ol. https://pubchem.ncbi.nlm.nih.gov/compound/1_2-dimethyl-9H-carbazol-4-ol. Accessed May 20, 2025, create date Mar. 31, 2015. (Year: 2015).*
Aizawa, N. et al., "Instant Low-Temperature Cross-Linking of Poly(N-vinylcarbazole) for Solution-Processed Multilayer Blue Phosphorescent Organic Light-Emitting Devices", Advnaced Materials, 26(45), 7543, 2014.
Bashir, M. et al., "Recent Developments and Biological Activities of N-Substituted Carbazole Derivatives: A Review", Molecules, 20(8): 13496-13517, 2015.
Bernardo, P. et al., "Synthesis, Electrochemistry, and Bioactivity of the Cyanobacterial Calothrixins and Related Quinones", Journal of Medicinal Chemistry, 47(20), 4958-4963, 2004.
Bhosale, S. et al., "An efficient total synthesis of calothixin B", Tetrahedron Letters, 53(23), 2894-1896, 2012.
Castagna, M. et al., "Direct activation of calcium-activated, phospholipid-dependent protein kinase by tumor-promoting phorbol esters.", Journal of Biological Chemistry, 257(13), 7847-7851, 1982.
Fox, J. C et al., "The total synthesis of K-252c (staurosporinone) via a sequential C—H functionalisation strategy", Chem. Sci., 7, 2706-2710, 2016.
Hughes, I. et al., "Synthesis of the Indolo [2,3-a]carbazole Natural Products Staurosporinone and Arcyriaflavin B", J. Chem. Soc. Perkin Trans 1, 2475-2480, 1990.
Intaraudom, C. et al., "Antimalarial and antituberculosis substances from Streptomyces sp. BCC26924", Tetrahedron, 67(39): 7593-7597, 2011.
Cadogan et al., " The Reactivity of Organophosphorus Compounds. Part XIX. Reduction of Nitro-compounds by Triethyl Phophite: a Convenient New Route to Carbazoles, Indoles, Indazoles, Triazoles, and Related Compounds", J. Chem. Soc., 4831-4837, 1965.
Smith et al., "Novel carvedilol Analogs that Suppress Store Overload Induced $Ca^{2+}$ Release", J Med Chem., 56(21), 8626-8655, 2013.

Kase, H. et al., "K-252a, A Potent Inhibitor of Protein Kinase C From Microbial Origin", The Journal of Antibiotics, 34, 1059-1065, 1986.
Kelly, T. R. et alk., "Synthesis of the Potent Antimalarials Calothrixin A and B", Organic Letters, 2(23), 3735-3737, 2000.
Khan, Q. et al., "Calothrixins, a New Class of Human DNA Topoisomerase I Poisons", Journal of Natural Products, 72(3), 438-442, 2009.
Knolker and Reddy, "Biology and Pharmacological Activities of Carbazole Alkaloids", The Alkaloids: Chemistry and Biology, 65: 181-193, 2008.
Knolker and Reddy, "Isolation and Synthesis of Biologically Active Carbazole Alkaloids", Chemical Reviews, 102(11), 4303-4428, 2002.
Levick, M. et al., "A Sm(II)-Mediated Cascade Approach to Dibenzoindolo[3,2-b]carbazoles: Synthesis and Evaluation", Organic Letters, 16, 2292, 2014.
Lin, K. et al., "A rapid construction of a specific quino[4,3-b] carbazolone system and its application for the synthesis of calothrixin B", Organic Chemistry Frontiers, 5(4), 590-594, 2018.
Xu, S. et al., Cyanobacterial Metabolite Calothrixins: Recent Advances in Synthesis and Biological Evaluation, 14, 17, 2016.
Markad and Argade, "Diversity Oriented Convergent Access for Collective Total Synthesis of Bioactive Multifunctional Carbazole Alkaloids: Synthesis of Carbazomycin A, Carbazomycin B, Hyellazole, Chlorohyellazole, and Clausenaline D", Organic Letters, 16(20), 5470-5473, 2014.
Matsumoto, K. et al., "Synthesis and antimalarial activity of calothrixins A and B, and their N-alkyl derivatives", Bioorganic and Medicinal Chemistry Letters, 22(14), 4762-4764, 2012.
McErlean, C. et al., "Synthesis of the calothrixins, pentacyclic indolo[3,2-j]phenanthridine alkaloids, using a biomimetic approach", Tetrahedron, 63(45), 10963-10970, 2007.
Moody and Shah, "Synthesis of the carbazole alkaloids carbazomycin A and B and hyellazole", J. Chem. Soc. Perkin Transactions I, 0, 376-377, 1989.
Nakamura et al., "New Antibiotics, Carbazomycins A and B", Journal of Antibiotics, 33, 683-689, 1980.
Nishizuka, Y., "The role of protein kinase C in cell surface signal transduction and tumour promotion", Nature, 308, 693-698, 1984.
Yao, Q. et al., "Transition-Metal-Free Ring Expansion Reactions of Indene-1, 3-dion: Synthesis of Functionalized Benzoannulated Seven-Membered Ring Compound", Org. Lett., 20(7): 1744-1747, 2018.
Ramkumar and Nagarajan, "Total Synthesis of Calothrixin A and B via C—H Activation", The Journal of Organic Chemistry, 78(6), 2802-2807, 2013.
Rickards, R. et al., "Calothrixins A and B, novel pentacyclic metabolites from Calothrix cyanobacteria with potent activity against malaria parasites and human cancer cells", Tetrahedron, 55(47), 13513-13520, 1999.
Roy, J. et al., "Recent trends in the synthesis of carbazoles: an update", Tetrahedron, 68(31), 6099-6121, 2012.
Schmidt, A. et al., "Occurrence, Biogenesis, and Synthesis of Biologically Active Carbazole Alkaloids", Chemical Reviews, 112(6), 3193-3328, 2012.
Singh, S. et al., "Nitromethane as a Carbanion Source for Domino Benzoannulation with Ynones: One-Pot Synthesis of Polyfunctional Naphthalenes and a Total Synthesis of Macarpine", Angewandte Chemie Int. Ed., 57(51), 16847, 2018.
Cadogan, "Phosphite-Reduction of Aromatic Nitro-Compounds as a Route to Heterocycles", Synthesis, 11-17, 1969.
Thomas, K. R. et al., "Light-Emitting Carbazole Derivatives: Potential Electroluminescent Materials", J. Am. Chem. Soc., 123(38): 9404-9411, 2001.
Wang, C. et al., "Semiconducting TT-Conjugated Systems in Field-Effect Transistors: A Material Odyssey of Organic Electronics", Chemical Reviews, , 112(4): 2208-2267, 2012.
Wood, J. et al., "Design and Implementation of an Efficient Synthetic Approach to Pyranosylated Indolocarbazoles: Total Synthesis of (+)-RK286c, (+)-MLR-52, (+)-Staurosporine, and (−)-TAN-1030a", Journal of the American Chemical Society, 119(41), 9652-9661, 1997.
Wu, Y. et al., "Total Synthesis of Carbazomycins", Chemical and Pharmaceutical Bulletin, 66(2), 178-183, 2018.

(56) References Cited

OTHER PUBLICATIONS

Yamabuki, A. et al., "A biomimetic synthesis of the indolo[3,2-j]phenanthridine alkaloid, calothrixin B", *Tetrahedron Letters*, 47(33), 5859-5861, 2006.

Yang, W. et al., "Controlling optoelectronic properties of carbazole-phosphine oxide hosts by short-axis substitution for low-voltage-driving PHOLEDs", *Chemical Communications*, 49:2822-2824, 2013.

Yasuzawa, T. et al., "The Structures of the Novel Protein Kinase C Inhibitors K-252a, b, c AND d" *The Journal of Antibiotics*, 34, 1072-1078, 1986.

Zhang and Ma, "Transition Metal-Catalyzed Benzannulation towards Naturally Occurring Carbazole Alkaloids", *Israel Journal of Chemistry*, 58(5), 608-621, 2018.

Zhang et al., "Synthesis, antibacterial and antifungal activities of some carbazole derivatives", *Bioorganic & Medicinal Chemistry Letters*, 20(6): 1881-1884, 2010.

Zheng, X. et al., "Benzannulation of Indoles to Carbazoles and Its Applications for Syntheses of Carbazole Alkaloids", *Organic Letters*, 16, 5156-5159, 2014.

Tamaki, K. et al. "Efficient Syntheses of Novel C2-Alkylated (+)-K252a Analogues", *Organic Letters*, 3(11), 1689-1692, 2001.

Nakanishi et al., "K-252b, c and d, potent inhibitors of protein kinase c from microbial origin", *The Journal of Antibiotics*, vol. 34, No. 8, pp. 1066-1071, 1986.

Choshi et al., "Progress towards the total synthesis of the bioactive calothrixins A and B", *Heterocycles*, vol. 77, No. 1, pp. 85-97, 2009.

\* cited by examiner

INDOLE-YNONE MEDIATED BENZOANNULATION PROCESS FOR THE PREPARATION OF CARBAZOLES, CARBAZOMYCIN A, CALOTHRIXIN B AND STAUROSPORINONE

CROSS-REFERENCE TO RELATED APPLICATIONS

This application is a national phase application under 35 U.S.C. § 371 of International Application No. PCT/IN2020/050275 filed 24 Mar. 2020, which claims priority to Indian Patent Application No. 20191012434 filed 29 Mar. 2019.

FIELD OF THE INVENTION

The present invention relates to carbazoles of general formula (I), and process for the preparation thereof:

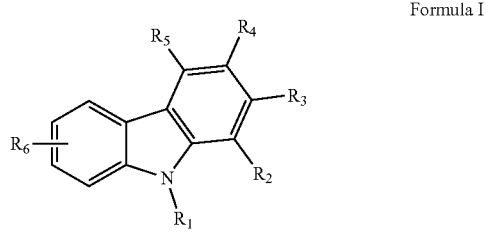

Formula I wherein '$R_1$' is H, C1-C6 alkyl, benzyl, or allyl; $R_2$ is H, C1-C6 alkyl, cyclopropyl, phenyl, aryl, heteroaryl, or $NO_2$; $R_3$ is H, C1-C6 alkyl, cyclopropyl, phenyl aryl, heteroaryl, 4-methoxy phenyl, 4-ethyl phenyl, 2-methyl phenyl, or 2-Fluoro phenyl; $R_4$ is H, benzoyl, —$CO_2$Et, —CHO, Br, or —OMe; $R_5$ is OH, OMOM, OMe, CN, or OTf; $R_6$ is H, or O-alkyl; and $R_3$-$R_4$ is —$CHNCH_2CH_2$—.

This invention also relates to the process for the preparation of carbazomycin A of Formula (1), calothrixin B of Formula (2) and staurosporinone of Formula (3) involving carbazoles of general formula (I) as an intermediate.

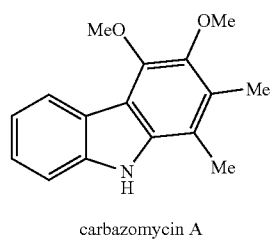

(1)

carbazomycin A

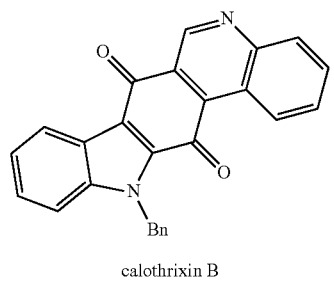

(2)

calothrixin B

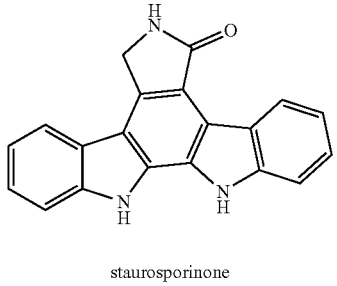

(3)

staurosporinone

In particular, the invention also relates to the total synthesis of carbazomycin A of Formula (1), calothrixin B of Formula (2) and staurosporinone of Formula (3).

BACKGROUND OF THE INVENTION

The present protocol focusses on the synthesis of the tricyclic nitrogen containing heterocyclic compounds called carbazoles, which are frequently encountered in natural products that are known to display therapeutic properties such as anti-cancer, anti-inflammatory, anti-viral, anti-oxidative, anti-mitotic, antipsychotic, and antibiotic properties (The Alkaloids: Chemistry and biology, 2008, 65, 181-193; Bioorg. Med. Chem. Lett., 2010, 20, 1881; Molecules, 2015, 20, 13496-13517; Tetrahedron 2011, 67, 7593-7597, US20150342927). Few carbazoles are also used in the treatment of ischemic heart diseases and congestive heart failures (J. Med. Chem. 2013, 21,8626). Furthermore, this class of compounds also serve as useful building blocks in organic materials due to their hole-transporting, light-emitting, photoconductive and photorefractive properties (Org. Lett. 2014, 16, 2292; Chem. Commun. 2013, 49, 2822, Chem. Rev., 2012, 112, 2208; J. Am. Chem. Soc., 2001, 123, 9404; Adv. Mater., 2014, 26, 7543, U.S. Pat. Nos. 9,911,925, 4,297,426). Because of the potential applications of these carbazole motif containing molecules, they have attracted significant attention from synthetic chemists towards developing new methods for their preparation ((Chem. Rev., 2002, 102, 4303; Tetrahedron 2012, 68, 6099-6121; Isr. J. Chem. 2018, 58, 608-621). While there are methods involved using transition-metal mediated cyclization's and construction of tricyclic moieties starting from indoles, the classical methods for accessing carbazoles include Fischer-Borsche synthesis and Cadogan cyclization (J. Chem. Soc., Perkin Trans. 1, 1990, 2475 J. Chem. Soc., 1965, 4831, Synthesis, 1969, 11). Various synthetic schemes are provided for the carbazoles. They can be synthesized from 2-amino diphenyl by heating at elevated temperatures (U.S. Pat. Nos. 2,328,588, 2,921,942A, others include treatment of cyclohexane-1,3-dione with phenyl hydrazine and conversion to carbazole (US20070197797A1).

Recently, nitromethane has been used as a one carbon linker with aryl-ynones resulting in the formation of two new C—C bonds with variation in the reactivity pattern to form naphthalene skeletons (Angewandte Chemie Int. Ed. Eng. 2018, 57, 16847). The present process demonstrates the benzoannulation of indole-ynones with nitromethane to synthesize several carbazole molecules of formula I, II, and III. The products (carbazoles) obtained by this process have been utilized further to achieve the total synthesis of natural products carbazomycin A (Chem. Pharm. Bull. 2018, 66, 178-183; Org. Lett. 2014, 16, 5470-5473), calothrixin B (Mar. Drugs 2016, 14, 17; Org. Chem. Front., 2018, 5, 590-594) and staurosporinone (Chem. Sci., 2016, 7, 2706-2710) in good yields.

The antibiotic carbazomycin A is structurally diverse 3,4-dioxygenated carbazole alkaloid which is isolated from *Streptomyces ehimense* H 1051-MY by Nakamura et al in 1980 (J. Antibiotics, 1980, 33, 683). The carbazomycins A and B displayed inhibitory activity against 5-lipoxygenase, and have weak antibacterial and anti yeast activities. Because of these activities, they have attracted significant attention by the chemists towards their synthesis. The first synthetic route for carbazomycin A involves the Diels Alder approach followed by functional groups interconversions (J. Chem. Soc. Perkin Transactions I, 1989, 0, 376) and was followed by several other synthetic approaches (for latest approach see Org. Lett. 2014, 16, 5470). The construction of fully substituted benzene ring has been the key factor. Despite several efforts have been focused to develop regioselective installation of appropriate substituents, the general and efficient methods are still limited (Chem. Rev. 2012, 112, 3193, Chem Rev. 2002, 102, 4303; Org. Lett. 2014, 16, 5156). The unique pentacyclic alkaloid, calothrixin B was isolated from calothrix cyanobacteria (Tetrahedron 1999, 55, 13513) and was found to display antimalarial and antiproliferative properties against HeLa cancer cells (Bioorg. Med. Chem. Lett. 2012, 22, 4762; J. Med. Chem. 2004, 47, 4958; J. Nat. Prod. 2009, 72, 438). The interesting biological properties of calothrixins have attracted significant attention from chemists towards their synthesis (Org. Lett. 2000, 2, 3735; Heterocycles 2009, 77, 85; Tetrahedron Lett. 2012, 53, 2894). The key known steps for its synthesis include ortho-lithiation strategy, palladium catalyzed intramolecular cross coupling reactions etc (J. Org. Chem. 2013, 78, 2802). and several other syntheses are known involving two biosynthetic routes (Tetrahedron 2007, 63, 10963; Tetrahedron Lett. 2006, 47, 5859).

The bioactive indolocarbazole alkaloid k-252c named as staurosporinone was isolated in 1986 from culture broths of Nocardiopsis sp K-252 and Nocardiopsis Sp. K-290 (J. Antibiot., 1986, 34, 1059, J. Antibiot., 1986, 34, 1066, J. Antibiot., 1986, 34, 1072). This compound is known to be potent inhibitor of protein kinase C which lays a crucial role in signal transduction pathways associated with metabolism, gene expression and cell proliferation (J. Biol. Chem., 1982, 257, 7847; Nature, 1984, 308, 693). The aglycone of staurosporine has attracted significant attention from chemists because of the interesting biological activity and novel functional pattern of the hexasubstituted arene framework. Some of the key synthetic methods involve metal catalyzed C—H amination and C—H carbonylation reactions along with several other key reactions (Org. Lett., 2001, 3, 1689; J. Am. Chem. Soc., 1997, 119, 9652, for staurosporine derivatives see U.S. Pat. No. 5,093,330A).

OBJECTIVE OF THE INVENTION

The main object of the present invention is to provide a present invention relates to carbazoles of general formula (I), and process for the preparation thereof:

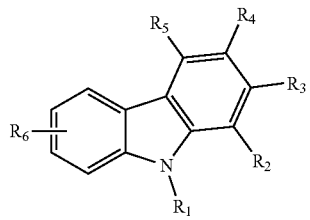

Formula I wherein '$R_1$' is H, C1-C6 alkyl, benzyl, or allyl; $R_2$ is H, C1-C6 alkyl, cyclopropyl, phenyl, aryl, heteroaryl, C1-C6 methoxy carbonyl, or $NO_2$; $R_3$ is H, C1-C6 alkyl, cyclopropyl, phenyl aryl, heteroaryl, 4-methoxy phenyl, 4-ethyl phenyl, 2-methyl phenyl, 2-Fluoro phenyl, 4-Fluoro phenyl, or 4-butyl phenyl; $R_4$ is H, benzoyl, —$CO_2Et$, —CHO, Br, or —OMe; $R_5$ is OH, OMOM, OMe, CN, or OTf; $R_6$ is H, or O-alkyl; and $R_3$-$R_4$ is —$CHNCH_2CH_2$—.

Another objective of the present invention is to provide the process for the preparation of carbazomycin A of Formula (1), calothrixin B of Formula (2) and staurosporinone of Formula (3) involving carbazoles of general formula (I) as an intermediate.

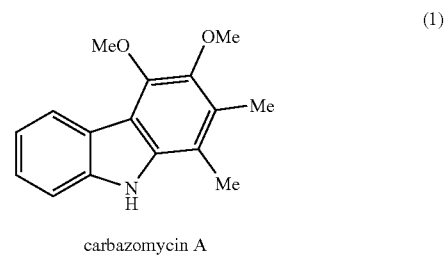

carbazomycin A (1)

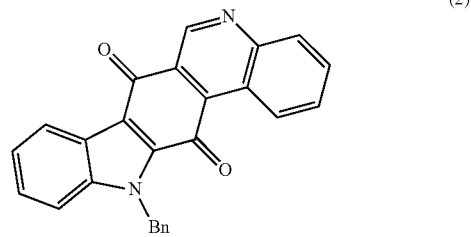

calothrixin B (2)

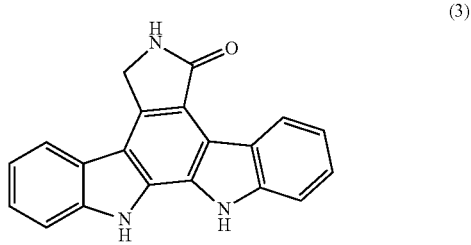

staurosporinone (3)

In another objective of the invention is to provide the total synthesis of carbazomycin A of Formula (1), calothrixin B of Formula (2) and staurosporinone of Formula (3).

In yet another objective of the present invention is to provide a new and efficient processes and intermediates for the preparation of carbazoles through benzoannulation of indolo-ynones with nitromethane and its derivatives.

Another objective of the present invention is to provide the process, which could be carried out by employing two C—C bond activation protocol using a strategy of benzo-annulation of indole-ynone and nitromethane.

Another objective of the present invention is to extend the strategy and utilize one of the obtained carbazole product for the total synthesis of natural product carbazomycin A in a concise approach.

Another objective of the present invention is to extend the strategy and utilize one of the obtained nitro-substituted carbazole product for the total synthesis of natural product calothrixin B in a concise approach.

Another objective of the present invention is to extend the strategy and utilize one of the obtained nitro-substituted carbazole product for the total synthesis of natural product staurosporinone in a concise approach.

Another objective of the present invention is the process for the total synthesis of natural products carbazomycin A, calothrixin B and staurosporinone.

SUMMARY OF THE INVENTION

In an embodiment, the present invention provides a carbazoles of general formula (I):

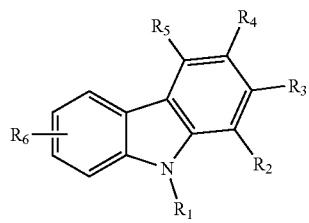

Formula I wherein 'R$_1$' is H, C1-C6 alkyl, benzyl, or allyl; R$_2$ is H, C1-C6 alkyl, cyclopropyl, phenyl, aryl, heteroaryl, C1-C6 methoxy carbonyl, or NO$_2$; R$_3$ is H, C1-C6 alkyl, cyclopropyl, phenyl aryl, heteroaryl, 4-methoxy phenyl, 4-ethyl phenyl, 2-methyl phenyl, 2-Fluoro phenyl, 4-Fluoro phenyl, or 4-butyl phenyl; R$_4$ is H, benzoyl, —CO$_2$Et, —CHO, Br, or —OMe; R$_5$ is OH, OMOM, OMe, CN, or OTf; R$_6$ is H, or O-alkyl; and R$_3$-R$_4$ is —CHNCH$_2$CH$_2$—.

In an embodiment, the present invention provides, a compound of general formula (II):

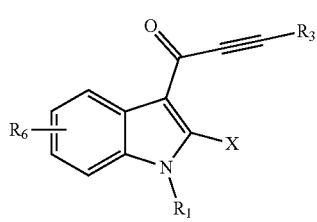

Formula (II)

wherein 'R$_1$' is H, C1-C6 alkyl, benzyl, or allyl; R$_3$ is H, C1-C6 alkyl, cyclopropyl, phenyl aryl, heteroaryl, 4-methoxy phenyl, 4-ethyl phenyl, 2-methyl phenyl, or 2-Fluoro phenyl; R$_6$ is H, or O-alkyl; R$_3$-R$_4$ is —CHNCH2CH2-; and 'X' is H, F, Cl, I, or Br.

In another embodiment, the present invention provides, process for the preparation of carbazoles of general formula (I) comprising: treatment of indole-ynone of formula (II)

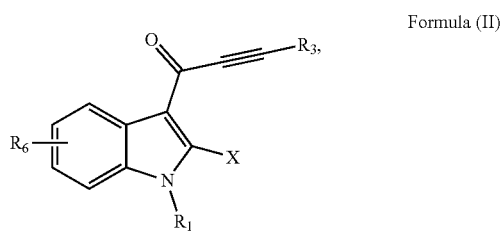

Formula (II)

with nitroalkane or substituted nitroalkane of formula (III)

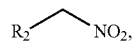

in the presence of a suitable organic or inorganic base in a suitable polar aprotic solvent at about 80-120° C. for about 10-15 h to obtain compound of Formula I,

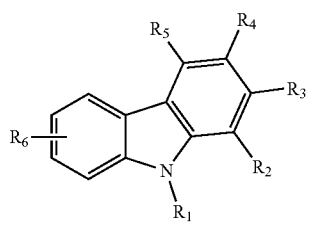

Formula I wherein 'R$_1$' is H, C1-C6 alkyl, benzyl, or allyl; R$_2$ is H, C1-C6 alkyl, cyclopropyl, phenyl, aryl, heteroaryl, C1-C6 methoxy carbonyl, or NO$_2$; R$_3$ is H, C1-C6 alkyl, cyclopropyl, phenyl aryl, heteroaryl, 4-methoxy phenyl, 4-ethyl phenyl, 2-methyl phenyl, 2-Fluoro phenyl, 4-Fluoro phenyl, or 4-butyl phenyl; R$_4$ is H, benzoyl, —CO$_2$Et, —CHO, Br, or —OMe; R$_5$ is OH, OMOM, OMe, CN, or OTf; R$_6$ is H, or O-alkyl; R$_3$-R$_4$ is —CHNCH$_2$CH$_2$—; and 'X' is H, F, Cl, I, or Br.

In another embodiment, the present invention provides a process for the preparation of carbazomycin A of Formula (1), calothrixin B of Formula (2) and staurosporinone of Formula (3):

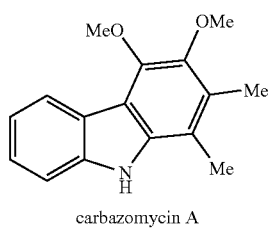

carbazomycin A

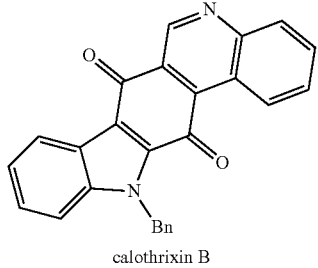

calothrixin B (2)

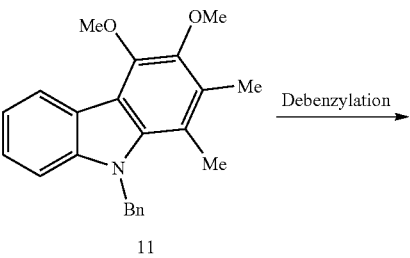

11

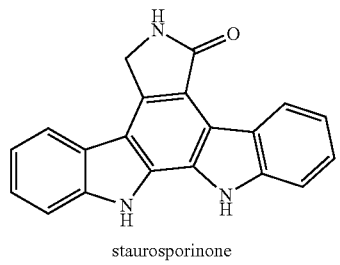

staurosporinone (3)

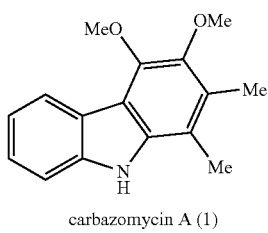

carbazomycin A (1)

In another embodiment, the present invention provides a process for the preparation of carbazomycin A of Formula (1), calothrixin B of Formula (2) and staurosporinone of Formula (3) involving carbazoles of general formula (I) as an intermediate.

In yet another embodiment, the present invention provides, process for the preparation of carbazomycin A of Formula (1) comprising the following steps:

In yet another embodiment, the present invention provides, process for the preparation of calothrixin B of Formula (2) comprising the following steps:

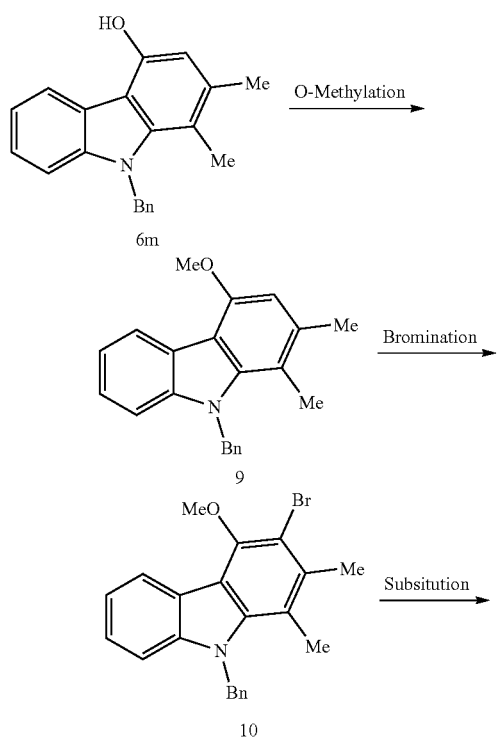

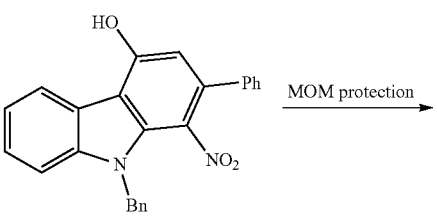

8a

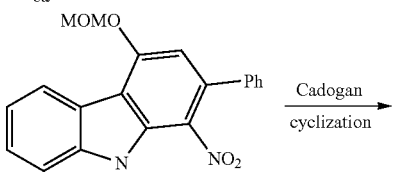

12

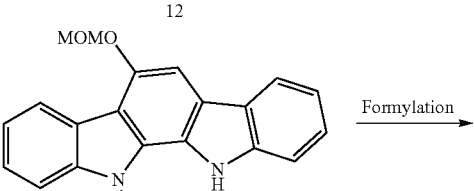

13

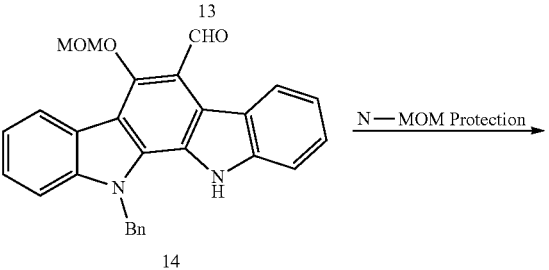

14

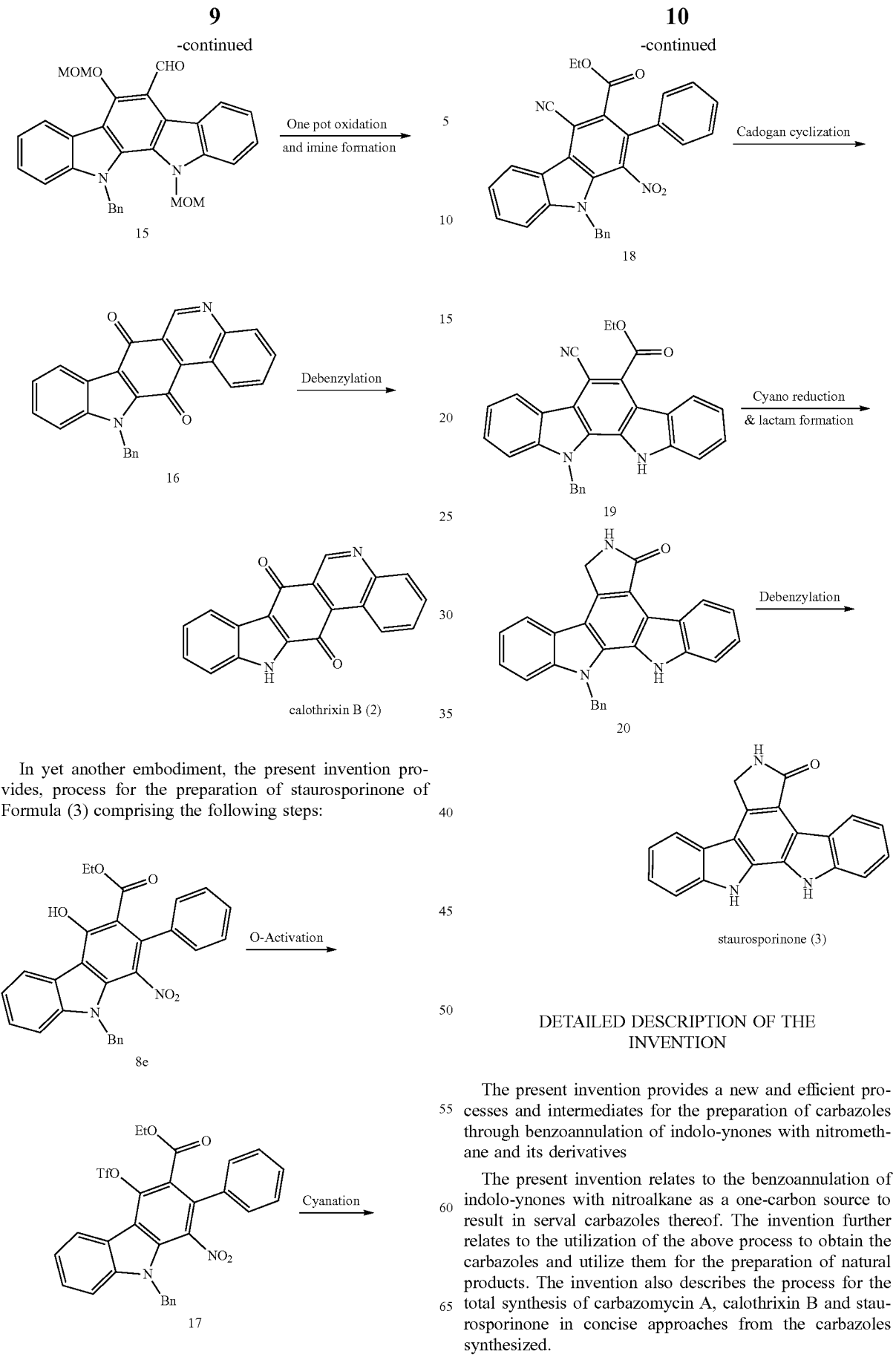

In yet another embodiment, the present invention provides, process for the preparation of staurosporinone of Formula (3) comprising the following steps:

DETAILED DESCRIPTION OF THE INVENTION

The present invention provides a new and efficient processes and intermediates for the preparation of carbazoles through benzoannulation of indolo-ynones with nitromethane and its derivatives The present invention relates to the benzoannulation of indolo-ynones with nitroalkane as a one-carbon source to result in serval carbazoles thereof. The invention further relates to the utilization of the above process to obtain the carbazoles and utilize them for the preparation of natural products. The invention also describes the process for the total synthesis of carbazomycin A, calothrixin B and staurosporinone in concise approaches from the carbazoles synthesized.

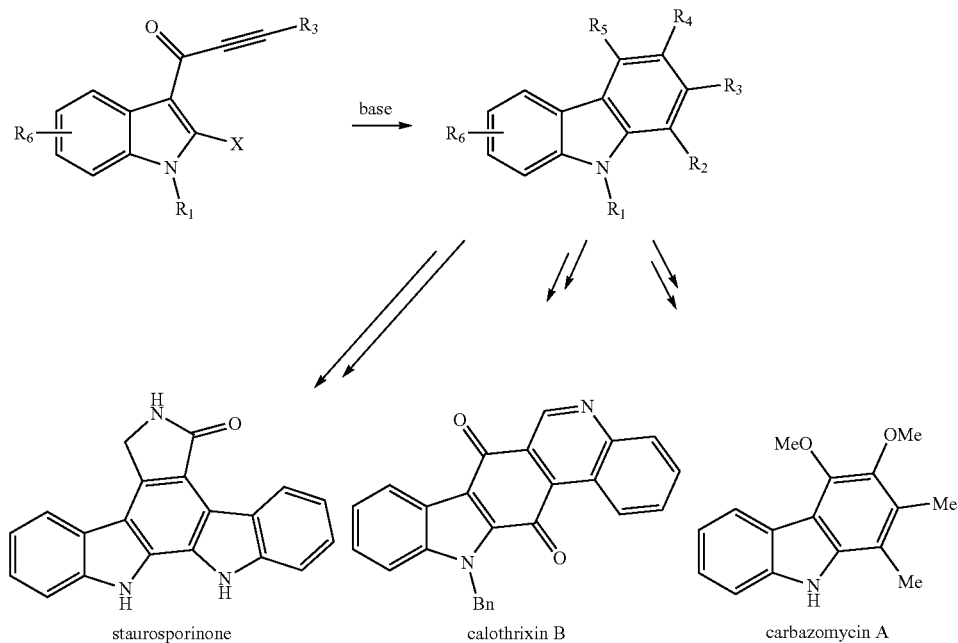

staurosporinone    calothrixin B    carbazomycin A

The strategy of present invention is extended to utilize one of the obtained carbazole product for the total synthesis of natural product, such as, but not limited to: carbazomycin A, calothrixin B and staurosporinone.

As used herein, the modifier "about" should be considered as disclosing the range defined by the absolute values of the two endpoints. For example, the expression "from about 1 to about 4" also discloses the range "from 1 to 4." When used to modify a single number, the term "about" may refer to ±10% of the said number including the indicated number. For example, "about 10%" may cover a range of 9% to 11%, and "about 1" means from 0.9-1.1.

As used herein, the term "polar aprotic solvents" refers to any organic solvent that lack an acidic hydrogen.

In an embodiment, the present invention provides a carbazoles of general formula (I):

Formula I

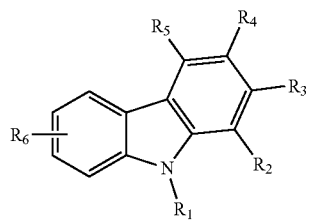

wherein 'R$_1$' is H, C1-C6 alkyl, benzyl, or allyl; R$_2$ is H, C1-C6 alkyl, cyclopropyl, phenyl, aryl, heteroaryl, C1-C6 methoxy carbonyl, or NO$_2$; R$_3$ is H, C1-C6 alkyl, cyclopropyl, phenyl aryl, heteroaryl, 4-methoxy phenyl, 4-ethyl phenyl, 2-methyl phenyl, 2-Fluoro phenyl, 4-Fluoro phenyl, or 4-butyl phenyl; R$_4$ is H, benzoyl, —CO$_2$Et, —CHO, Br, or —OMe; R$_5$ is OH, OMOM, OMe, CN, or OTf; R$_6$ is H, or O-alkyl; and R$_3$-R$_4$ is —CHNCH$_2$CH$_2$—; and the compounds of Formula I are:
9-Methyl-2-phenyl-9H-carbazol-4-ol (6a);
9-Benzyl-2-phenyl-9H-carbazol-4-ol (6b);
9-Allyl-2-phenyl-9H-carbazol-4-ol (6c);
9-Methyl-2-(m-tolyl)-9H-carbazol-4-ol (6d);
2-(4-Ethylphenyl)-9-methyl-9H-carbazol-4-ol (6e);
2-(4-Methoxyphenyl)-9-methyl-9H-carbazol-4-ol (6f);
2-Butyl-9-methyl-9H-carbazol-4-ol (6g);
2-Cyclopropyl-9-methyl-9H-carbazol-4-ol (6h);
6-Methoxy-9-methyl-2-phenyl-9H-carbazol-4-ol (6i);
1,9-Dimethyl-2-phenyl-9H-carbazol-4-ol (6j);
1-Ethyl-9-methyl-2-phenyl-9H-carbazol-4-ol (6k);
Methyl 3-(4-hydroxy-9-methyl-2-phenyl-9H-carbazol-1-yl) propanoate (6l);
9-Benzyl-1,2-dimethyl-9H-carbazol-4-ol (6m);
Ethyl 4-hydroxy-9-methyl-2-phenyl-9H-carbazole-3-carboxylate (7a);
Ethyl 2-cyclopropyl-4-hydroxy-9-methyl-9H-carbazole-3-carboxylate (7b);
Ethyl 4-hydroxy-6-methoxy-9-methyl-2-phenyl-9H-carbazole-3-carboxylate (7c);
(4-hydroxy-9-methyl-2-phenyl-9H-carbazol-3-yl)(phenyl) methanone (7d);
(2-(2-fluorophenyl)-4-hydroxy-9-methyl-9H-carbazol-3-yl) (phenyl)methanone (7e);
(4-Hydroxy-6-methoxy-9-methyl-2-phenyl-9H-carbazol-3-yl)(phenyl)methanone (7f);
9-Benzyl-1-nitro-2-phenyl-9H-carbazol-4-ol (8a);
2-(4-Fluorophenyl)-9-methyl-1-nitro-9H-carbazol-4-ol (8b);
2-(4-Butylphenyl)-9-methyl-1-nitro-9H-carbazol-4-ol (8c);
2-Butyl-9-methyl-1-nitro-9H-carbazol-4-ol (8d);
Ethyl 9-benzyl-4-hydroxy-1-nitro-2-phenyl-9H-carbazole-3-carboxylate (8e);
Ethyl 2-(4-fluorophenyl)-4-hydroxy-9-methyl-1-nitro-9H-carbazole-3-carboxylate (8f);
(4-Hydroxy-9-methyl-1-nitro-2-phenyl-9H-carbazol-3-yl) (phenyl)methanone (8g);
(2-(4-Butylphenyl)-4-hydroxy-9-methyl-1-nitro-9H-carbazol-3-yl)(phenyl)methanone (8h); and
(2-Cyclopropyl-4-hydroxy-9-methyl-1-nitro-9H-carbazol-3-yl)(phenyl)methanone (8i), etc.

In an embodiment, the present invention provides, a compound of general formula (II):

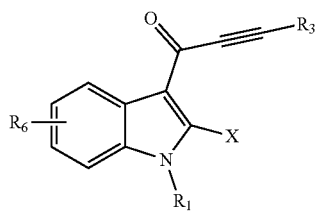

Formula (II)

wherein 'R$_1$' is H, C1-C6 alkyl, benzyl, or allyl; R$_3$ is H, C1-C6 alkyl, cyclopropyl, phenyl aryl, heteroaryl, 4-methoxy phenyl, 4-ethyl phenyl, 2-methyl phenyl, or 2-Fluoro phenyl; R$_6$ is H, or O-alkyl; R$_3$-R$_4$ is —CHNCH2CH2-; and 'X' is H, F, Cl, I, or Br.

In another embodiment, the compound of general formula (II) is selected from the group comprising compounds of following formula:

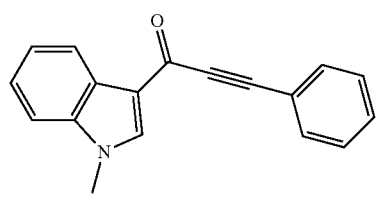
4a

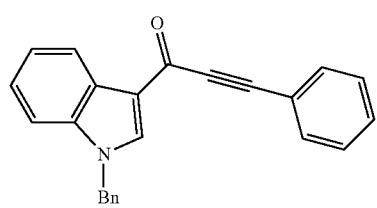
4b

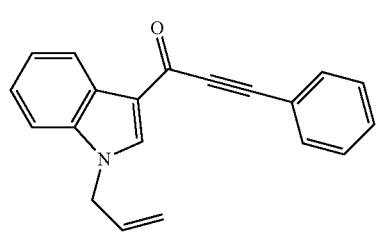
4c

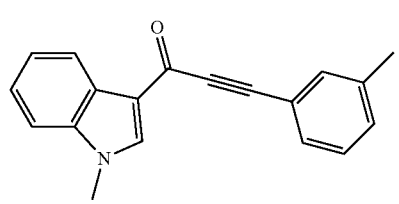
4d

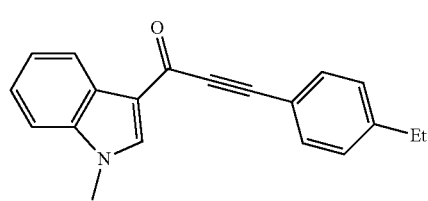
4e

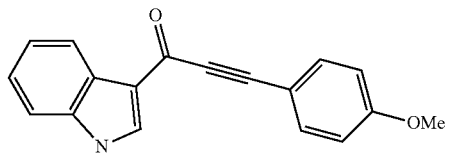
4f

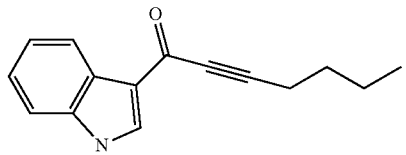
4g

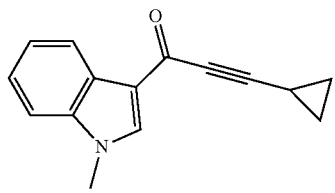
4h

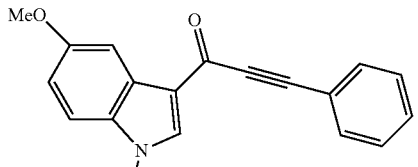
4i

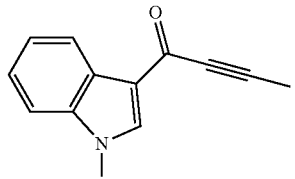
4j

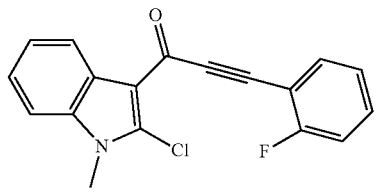
4k

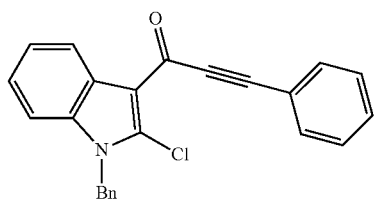
4l

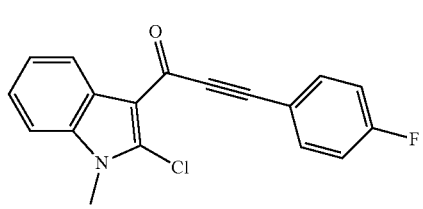
4m

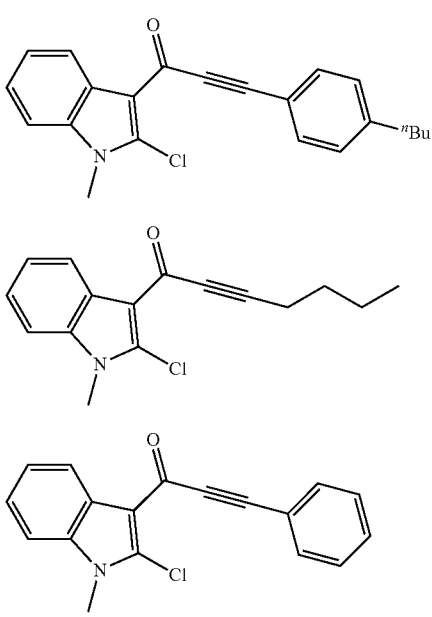

In another embodiment, the present invention provides, process for the preparation of carbazoles of general formula (I) comprising: treatment of indole-ynone of formula (II) with nitroalkane or substituted nitroalkane of formula (III) in the presence of a suitable organic or inorganic base in a suitable polar aprotic solvent at about 80-120° C. for about 10-15 h.

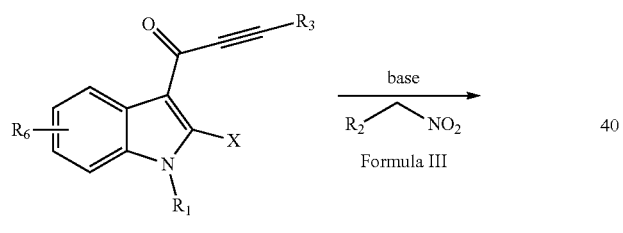

wherein '$R_1$' is H, C1-C6 alkyl, benzyl, or allyl; $R_3$ is H, C1-C6 alkyl, cyclopropyl, phenyl aryl, heteroaryl, 4-methoxy phenyl, 4-ethyl phenyl, 2-methyl phenyl, or 2-Fluoro phenyl; $R_6$ is H, or O-alkyl; $R_3$-$R_4$ is —CHNCH2CH2-; and 'X' is H, F, Cl, I, or Br.

In yet another embodiment, the present invention provides, reaction of the compounds of formula II [where X=H; $R_1$=C1-C6 alkyl, allyl; benzyl; $R_3$ is C1-C6 alkyl, cyclopropyl, phenyl, aryl; and R6 is H, alkoxy with inorganic base such as $K_2CO_3$ or $Cs_2CO_3$ or $Na_2CO_3$ in a polar solvents such as DMF or DMSO or Dioxane and heating the mixture along with nitroalkanes of formula III (Where $R_2$=H, C1-C6 alkyl) at a temperature from about 80-120° C. to provide the compounds of the formula I; wherein $R_1$=C1-C6 alkyl, allyl; $R_2$=H, alkyl, $R_3$ is C1-C6 alkyl, cyclopropyl, phenyl, aryl; $R_4$=H, $R_5$ is OH and R6 is H, alkoxy In yet another embodiment, the present invention provides, reaction of the compounds of formula II [indolo-ynones, where X=H; $R_1$=C1-C6 alkyl, allyl; benzyl; $R_3$ is C1-C6 alkyl, cyclopropyl, phenyl, aryl; and R6 is H, alkoxy with inorganic base such as $K_2CO_3$ or $Cs_2CO_3$ or $Na_2CO_3$ in polar solvents such as DMF or DMSO or dioxane and heating the mixture along with substituted nitroalkane of formula III, wherein $R_2$=H, Me, alkyl, —$CH_2CH_2COOMe$; at a temperature from about 80-120° C. to provide the compounds of the formula I; wherein, $R_1$ is H, methyl, benzyl, and allyl moiety; $R_2$ is H, Me, alkyl, —$CH_2CH_2COOMe$, $R_3$ is C1-C6 alkyl, cyclopropyl, phenyl, aryl; $R_4$ is benzoyl, ethoxycarbonyl; $R_5$ is OH, $R_6$ is alkoxy.

In yet another embodiment, the present invention provides, reaction of the indolo-ynones of formula II [where X=Cl, $R_1$=C1-C6 alkyl, allyl; benzyl; $R_3$ is C1-C6 alkyl, cyclopropyl, phenyl, aryl; and R6 is H, alkoxy with inorganic base such as $K_2CO_3$ or $Cs_2CO_3$ or $Na_2CO_3$ in polar solvents such as DMF or DMSO or Dioxane, and heating the mixture along with substituted nitrocompound such as benzoylnitromethane or ethylnitroacetate; at a temperature from 80-120° C. to provide the compounds of the formula I; wherein, $R_1$ is H, methyl, benzyl, and allyl moiety; $R_2$ is $NO_2$, $R_3$ is C1-C6 alkyl, cyclopropyl, phenyl, substituted aryl; $R_4$ is H, benzoyl, ethoxycarbonyl; $R_5$=OH, and $R_6$ is alkoxy.

In another embodiment, the present invention provides a process for the preparation of carbazomycin A of Formula (1), calothrixin B of Formula (2) and staurosporinone of Formula (3):

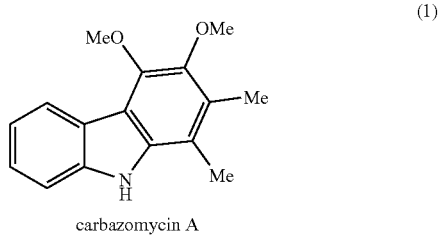

carbazomycin A

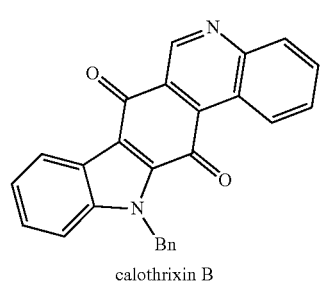

calothrixin B

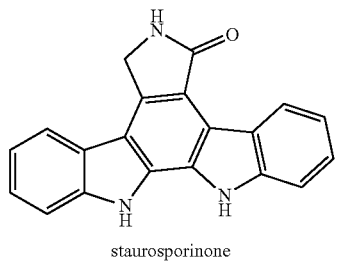

staurosporinone (3)

In another embodiment, the present invention provides a process for the preparation of carbazomycin A of Formula (1), calothrixin B of Formula (2) and staurosporinone of Formula (3) involving carbazoles of general formula (I) as an intermediate.

In yet another embodiment, the present invention provides, process for the preparation of carbazomycin A of Formula (1) comprising the following steps:

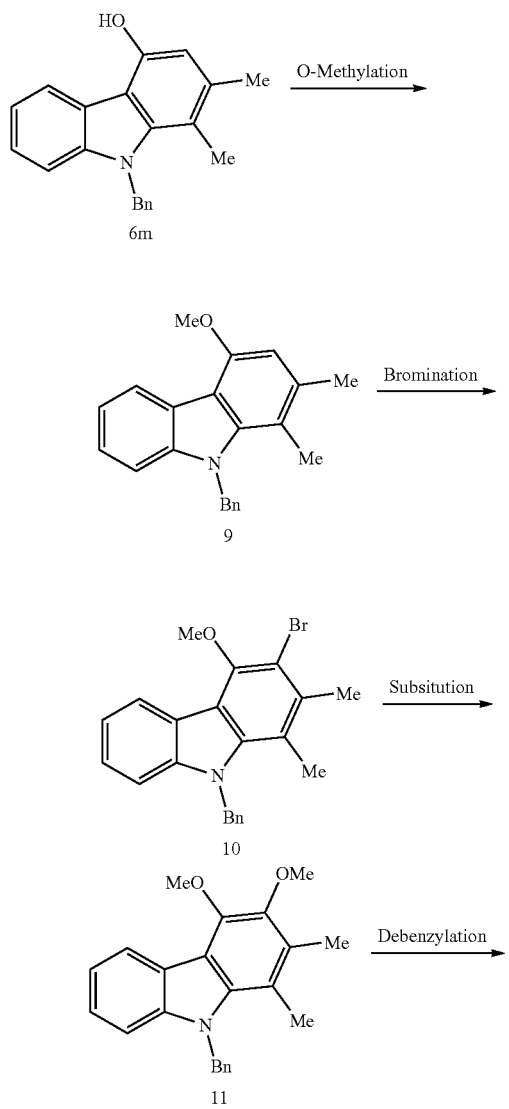

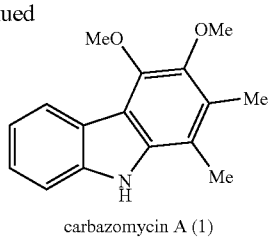

carbazomycin A (1)

In yet another embodiment, the present invention provides, process for the preparation of carbazomycin A of Formula (1) comprising:
a) O-methylation of compound of Formula (6m) to corresponding methoxy ether of Formula (9); preferably by reacting with methyl iodide or dimethyl sulfate in presence of a suitable base such as, but not limited to, potassium carbonate;
b) bromination of compound of Formula (9) to compound of Formula (10); preferably by reacting with NBS in presence of halogenated solvent such as, but not limited to, chloroform;
c) converting compound of Formula (10) to dimethoxy compound of Formula (11), preferably by reacting with sodium methoxide in presence of metal catalyst, such as, but not limited to, copper iodide; and
d) N-debenzylation of compound of Formula (11) to carbazomycin A of Formula (1); preferably by Pd/C under hydrogen atmosphere.

In yet another embodiment, the present invention also provides the process for the synthesis of carbazole of formula (6m), in particular; and its utility as an intermediate for the total synthesis of carbazomycin A.

In yet another embodiment, the present invention provides, process for the preparation of calothrixin B of Formula (2) comprising the following steps:

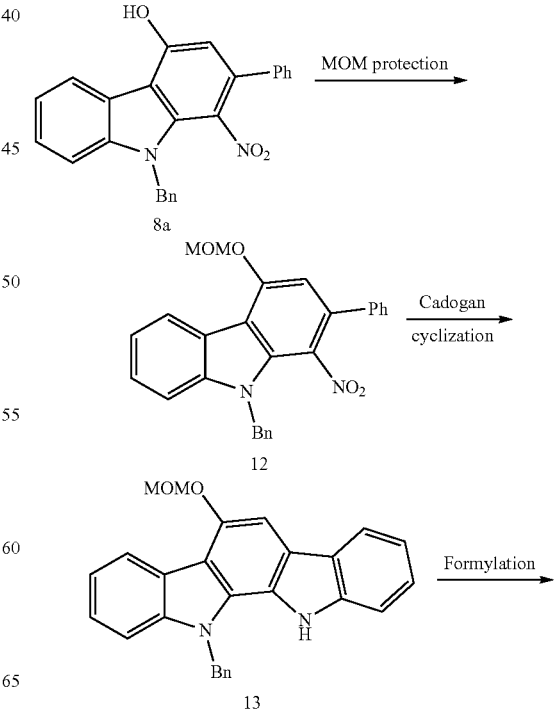

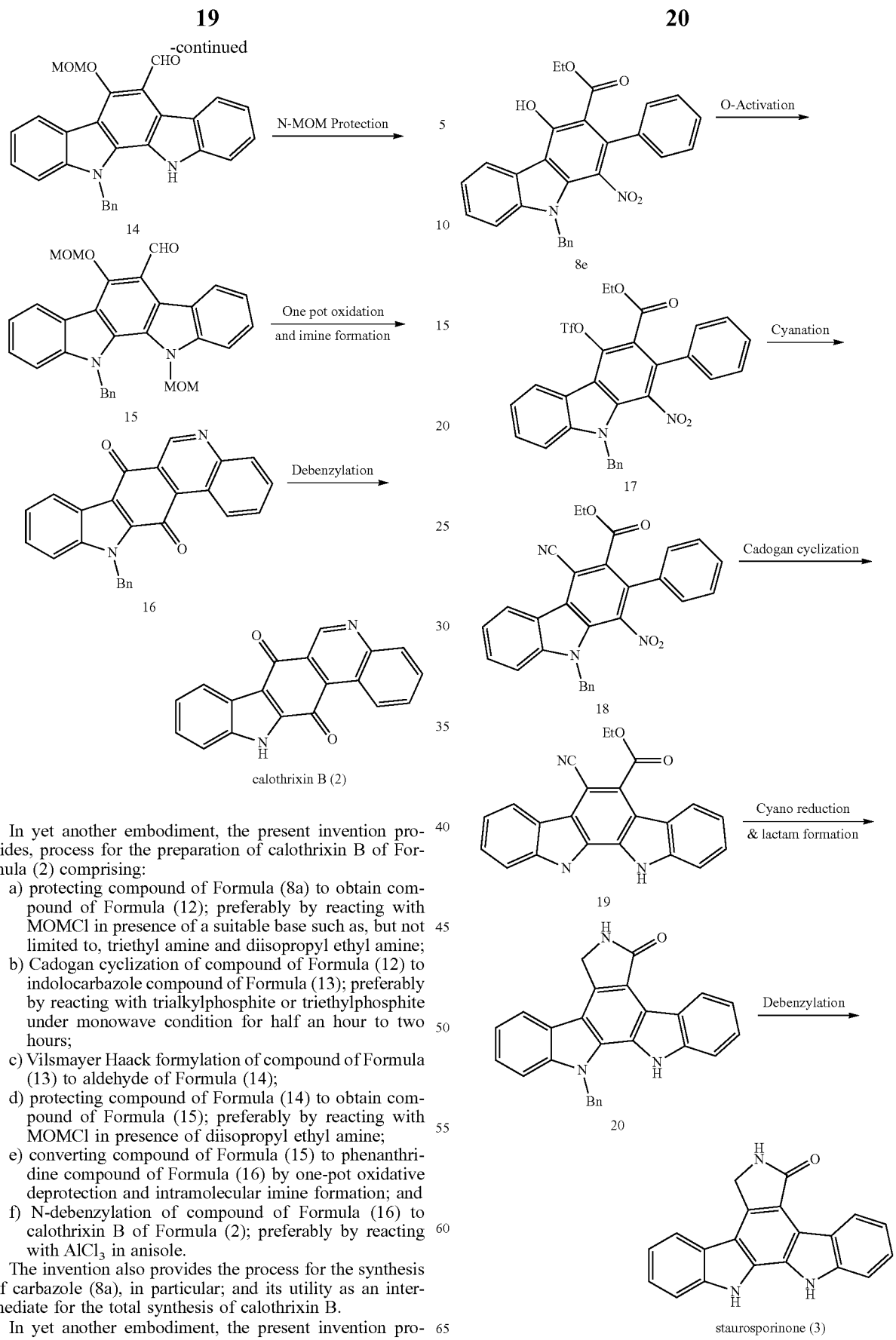

In yet another embodiment, the present invention provides, process for the preparation of calothrixin B of Formula (2) comprising:
a) protecting compound of Formula (8a) to obtain compound of Formula (12); preferably by reacting with MOMCl in presence of a suitable base such as, but not limited to, triethyl amine and diisopropyl ethyl amine;
b) Cadogan cyclization of compound of Formula (12) to indolocarbazole compound of Formula (13); preferably by reacting with trialkylphosphite or triethylphosphite under monowave condition for half an hour to two hours;
c) Vilsmayer Haack formylation of compound of Formula (13) to aldehyde of Formula (14);
d) protecting compound of Formula (14) to obtain compound of Formula (15); preferably by reacting with MOMCl in presence of diisopropyl ethyl amine;
e) converting compound of Formula (15) to phenanthridine compound of Formula (16) by one-pot oxidative deprotection and intramolecular imine formation; and
f) N-debenzylation of compound of Formula (16) to calothrixin B of Formula (2); preferably by reacting with AlCl₃ in anisole.

The invention also provides the process for the synthesis of carbazole (8a), in particular; and its utility as an intermediate for the total synthesis of calothrixin B.

In yet another embodiment, the present invention provides, process for the preparation of staurosporinone of Formula (3) comprising the following steps:

In yet another embodiment, the present invention provides, process for the preparation of staurosporinone of Formula (3) comprising:
a) Benzoannulation of chlorosubstituted N-benzylated indole-ynone of Formula (4l); preferably by reacting with ethyl nitroacetate and $Cs_2CO_3$ as a base in a suitable polar solvent such as DMF at 80-120° C. temperature for a period of 6-12 h to obtain compound 8e;
b) converting compound of Formula (8e) to triflate compound of Formula (17); preferably by reacting with triflic anhydride in presence of pyridine at 0° C. to room temperature for 2-6 h;
c) cyanation of compound of Formula (17) to compound of Formula (18); preferably by reacting with zinc cyanide in presence of metal catalyst such as tetrakistriphenyl phosphine and salf copper iodide in presence of polar solvent such as DMF at 110-140° C. for a period of 16-24 h;
d) Cadogen cyclization of compound of Formula (18) to compound of Formula (19); preferably by reacting with trialkylphosphite, such as, but not limited to triethylphosphite, under monowave condition for half an hour to two hours at 180-200° C.;
e) converting compound of Formula (19) to N-benzylated staurosporinone of Formula (20); preferably by reacting with Raney Nickel in polar solvent, such as, but not limited to isopropanol, tert-butanol, DMF, methanol and DMF or mixture thereof under hydrogen atmosphere at room 20-40° C. for 36-48 h; and
f) debenzylation of compound of Formula (20) to staurosporinone of Formula (3); preferably by reacting with $AlCl_3$ in presence of anisole at 0-110° C. for 30 min. to 2 h.

The invention also provides the process for the synthesis of carbazole (8e), in particular; and its utility as an intermediate for the total synthesis of staurosporinone.

LIST OF ABBREVIATIONS

HPLC=High pressure Liquid chromatography
TLC=Thin layer chromatography
NMR=Nuclear Magnetic resonance
UV=Ultra-Violet
HRMS=High resolution mass spectroscopy
GC=Gas chromatography
IR=Infra-red
DCM=Dichloromethane
CAN: Ceric ammonium nitrate
THF: tetrahydrofuran
DCM: dichloromethane
MOM=methoxymethyl Material and Method Used in Experiments Most of the reagents and chemicals used in the process are bought from Spectrochem, AVRA or Sigma-Aldrich, which were used as such without any further purification. Common organic chemicals and salts were purchased from AVRA chemicals, India.

All work-up and purification procedures were carried out with reagent-grade solvents. Analytical thin-layer chromatography (TLC) was performed using analytical chromatography silica gel 60 F254 precoated plates (0.25 mm). The developed chromatogram was analysed by UV lamp (254 nm) and by charring in solutions of anisaldehyde or □-naphtol. The reaction steps were monitored by thin layer chromatography and the crude products obtained were subjected to purification by column chromatography or crystallization or extraction or filtration to get the pure compounds. All the resultant products were characterized using available analytical and spectral methods.

In these processes, all the reaction steps were monitored by thin layer chromatography and the crude products obtained were subjected to purification using crystallization or chromatography using silica gel (60-120 or 100-200 mesh) mixture of polar and non-polar solvents as mobile phase to get the pure compounds in good yields. Further, all the resultant compounds/products were systematically characterized using various analytical and spectral methods.

Measurement Method

High-resolution mass spectra (HRMS) were obtained from a JMS-T100TD instrument (DART) and Thermo Fisher Scientific Exactive (APCI).

Nuclear magnetic resonance (NMR) spectra were recorded on a Bruker 600, 500, 400 or 300 MHz in $CDCl_3$ or DMSO-$d_6$ solvent. Chemical shifts for $^1H$ NMR are expressed in parts per million (ppm) relative to tetramethylsilane ($\delta$ 0.00 ppm). Chemical shifts for $^{13}C$ NMR are expressed in ppm relative to $CDCl_3$ ($\delta$ 77.0 ppm). Data are reported as follows: chemical shift, multiplicity (s=singlet, d=doublet, dd=doublet of doublets, t=triplet, q=quartet, quin=quintet, sext=sextet, m=multiplet), coupling constant (Hz), and integration.

EXAMPLES

Following examples are given by way of illustration and therefore should not be construed to limit the scope of the invention.

9-Methyl-2-phenyl-9H-carbazol-4-ol (6a);
9-Benzyl-2-phenyl-9H-carbazol-4-ol (6b);
9-Allyl-2-phenyl-9H-carbazol-4-ol (6c);
9-Methyl-2-(m-tolyl)-9H-carbazol-4-ol (6d);
2-(4-Ethylphenyl)-9-methyl-9H-carbazol-4-ol (6e);
2-(4-Methoxyphenyl)-9-methyl-9H-carbazol-4-ol (6f);
2-Butyl-9-methyl-9H-carbazol-4-ol (6g);
2-Cyclopropyl-9-methyl-9H-carbazol-4-ol (6h);
6-Methoxy-9-methyl-2-phenyl-9H-carbazol-4-ol (6i);
1,9-Dimethyl-2-phenyl-9H-carbazol-4-ol (6j);
1-Ethyl-9-methyl-2-phenyl-9H-carbazol-4-ol (6k);
Methyl 3-(4-hydroxy-9-methyl-2-phenyl-9H-carbazol-1-yl) propanoate (6l);
9-Benzyl-1,2-dimethyl-9H-carbazol-4-ol (6m);
Ethyl 4-hydroxy-9-methyl-2-phenyl-9H-carbazole-3-carboxylate (7a);
Ethyl 2-cyclopropyl-4-hydroxy-9-methyl-9H-carbazole-3-carboxylate (7b);
Ethyl 4-hydroxy-6-methoxy-9-methyl-2-phenyl-9H-carbazole-3-carboxylate (7c);
(4-hydroxy-9-methyl-2-phenyl-9H-carbazol-3-yl)(phenyl) methanone (7d);
(2-(2-fluorophenyl)-4-hydroxy-9-methyl-9H-carbazol-3-yl) (phenyl)methanone (7e);
(4-Hydroxy-6-methoxy-9-methyl-2-phenyl-9H-carbazol-3-yl)(phenyl)methanone (7f);
9-Benzyl-1-nitro-2-phenyl-9H-carbazol-4-ol (8a);
2-(4-Fluorophenyl)-9-methyl-1-nitro-9H-carbazol-4-ol (8b);
2-(4-Butylphenyl)-9-methyl-1-nitro-9H-carbazol-4-ol (8c);
2-Butyl-9-methyl-1-nitro-9H-carbazol-4-ol (8d);
Ethyl 9-benzyl-4-hydroxy-1-nitro-2-phenyl-9H-carbazole-3-carboxylate (8e);

Ethyl 2-(4-fluorophenyl)-4-hydroxy-9-methyl-1-nitro-9H-carbazole-3-carboxylate (8f);
(4-Hydroxy-9-methyl-1-nitro-2-phenyl-9H-carbazol-3-yl)(phenyl)methanone (8g);
(2-(4-Butylphenyl)-4-hydroxy-9-methyl-1-nitro-9H-carbazol-3-yl)(phenyl)methanone (8h);
(2-Cyclopropyl-4-hydroxy-9-methyl-1-nitro-9H-carbazol-3-yl)(phenyl)methanone (8i) etc.
In another embodiment, the representative compounds of Formula (I) are:
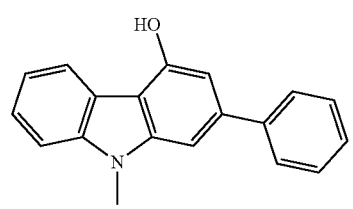
6a
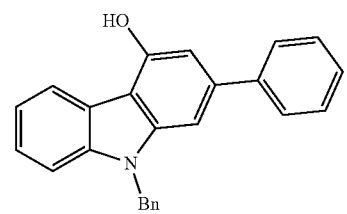
6b
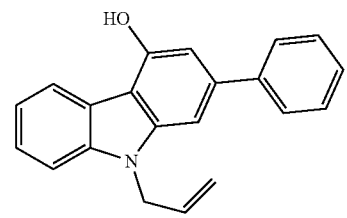
6c
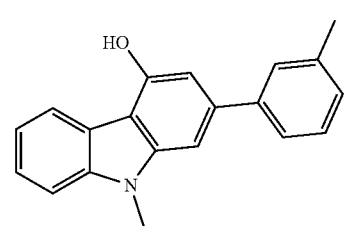
6d
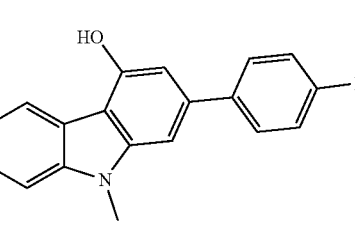
6e
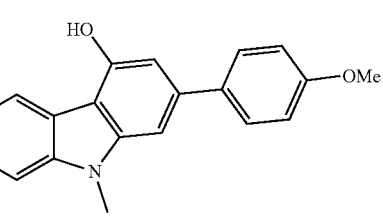
6f
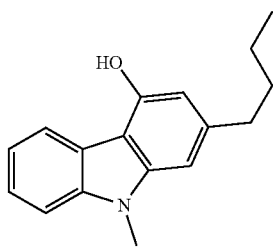
6g
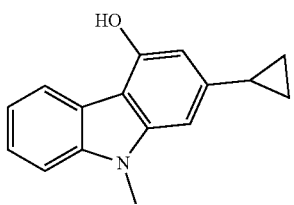
6h
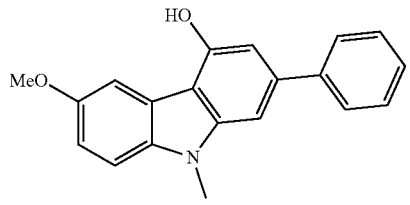
6i
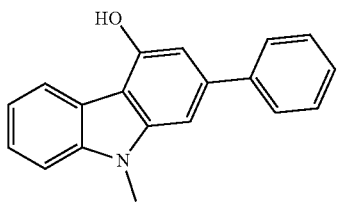
6j
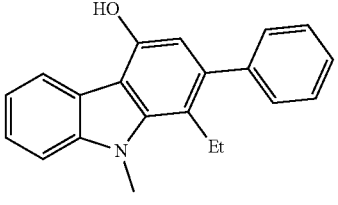
6k
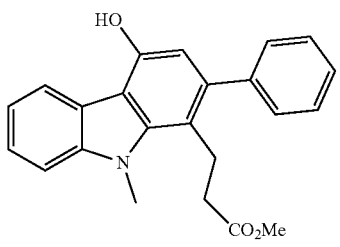
6l
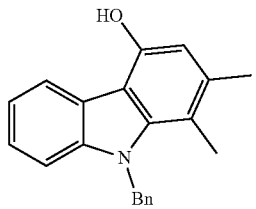
6m Procedure for the preparation of compounds of formula I (6a-6m), (7a-7f) and (8a-8i).

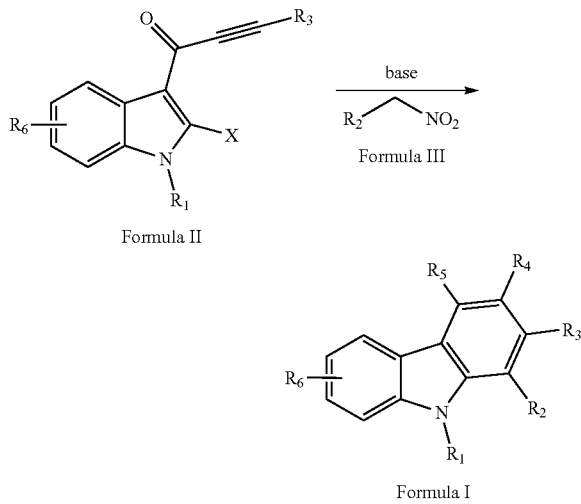

Formula II

Formula III

Formula I

General procedure 1: In an oven dried Ace pressure tube was taken indole-ynone (0.1 mmol) and nitromethane (0.3 mmol) and to this DMF (2 mL) and Cs$_2$CO$_3$ (0.2 mmol) were added and the cap was closed tightly, placed in a preheated oil bath at 100° C. and stirred for 12 h at the same temperature. The reaction mixture was cooled to room temperature and diluted with cold H$_2$O (5 mL) and extracted with EtOAc (3×5 mL). The combined organic extract was washed with brine (10 mL) and dried over anhydrous Na$_2$SO$_4$; volatiles were removed under reduced pressure to get the crude compound which was purified by silica gel flash column chromatography (EtOAc/Hexane) to give carbazoles (6a-6m, 7a-7f, 8a-8i).

Example 1: 9-Methyl-2-phenyl-9H-carbazol-4-ol (6a)

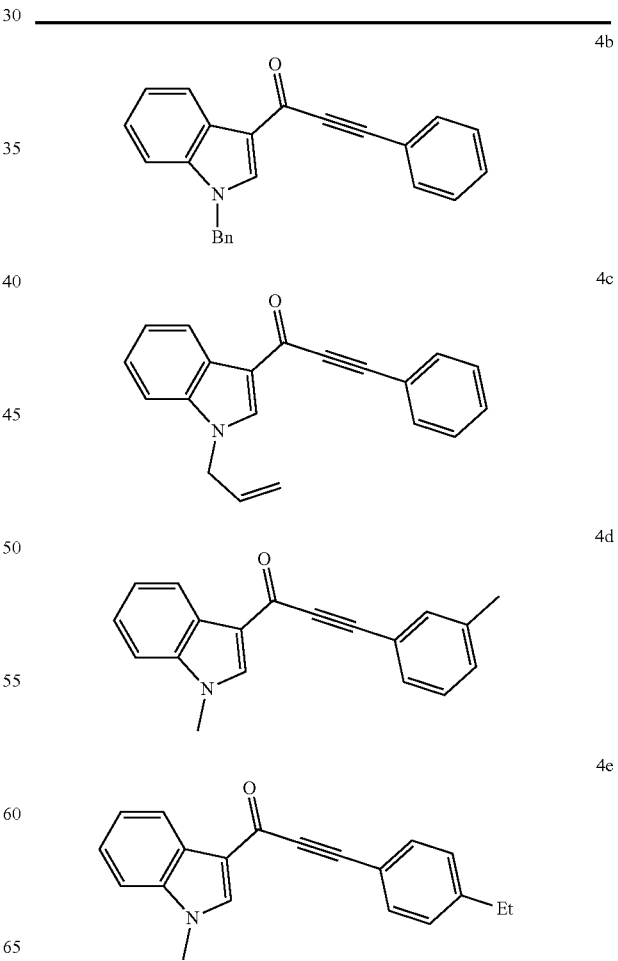

In an oven dried Ace pressure tube were taken indole-ynone 4a (0.1 mmol) and nitromethane (0.3 mmol) and to this DMF (2 mL) and Cs$_2$CO$_3$ (0.2 mmol) were added and the cap was closed tightly, placed in a preheated oil bath at 100° C. and stirred for 12 h at the same temperature. The reaction mixture was cooled to room temperature and diluted with cold H$_2$O (5 mL) and extracted with EtOAc (3×5 mL). The combined organic extract was washed with brine (10 mL) and dried over anhydrous Na$_2$SO$_4$; volatiles were removed under reduced pressure to get the crude compound which was purified by silica gel flash column chromatography (EtOAc/Hexane) to give carbazole 6a as pale brown solid (24.0 mg, 88%); R$_f$=0.4 (20% EtOAc+Hexane); mp 166-168° C.; $^1$H NMR (400 MHz, CDCl$_3$) δ 8.27 (d, J=7.7 Hz, 1H), 7.69-7.63 (m, 2H), 7.48-7.42 (m, 3H), 7.38-7.32 (m, 2H), 7.28-7.22 (m, 1H), 7.16 (d, J=1.2 Hz, 1H), 6.78 (d, J=1.2 Hz, 1H), 5.41 (s, 1H), 3.82 (s, 3H); $^{13}$C NMR (101 MHz, CDCl$_3$) δ 151.8, 143.4, 141.9, 140.9, 140.3, 128.8, 127.6, 127.3, 125.0, 122.7, 121.7, 119.4, 110.3, 108.1, 104.6, 100.3, 29.4; IR (neat): ☐$_{max}$ 641, 699, 756, 833, 922, 1156, 1263, 1329, 1489, 1601, 1634, 3051, 3472 cm$^{-1}$; HRMS (ESIMS) calcd. for C$_{19}$H$_{16}$NO [M+H]$^+$: calcd m/z 274.1233; found: 274.1232.

The compounds of formula 6b to 6m were synthesized following the procedure described above under example 1 and general procedure involving 4a-4j corresponding reactants of formula II and nitromethane (for 6a-6i), 4a with nitroethane for 6j, 4a with nitropropane for 6k, 4a with 3-nitromethyl butyrate for 6l, and 4j with nitroethane for 6m.

Reactants of formula II used for the synthesis of 6b-6m

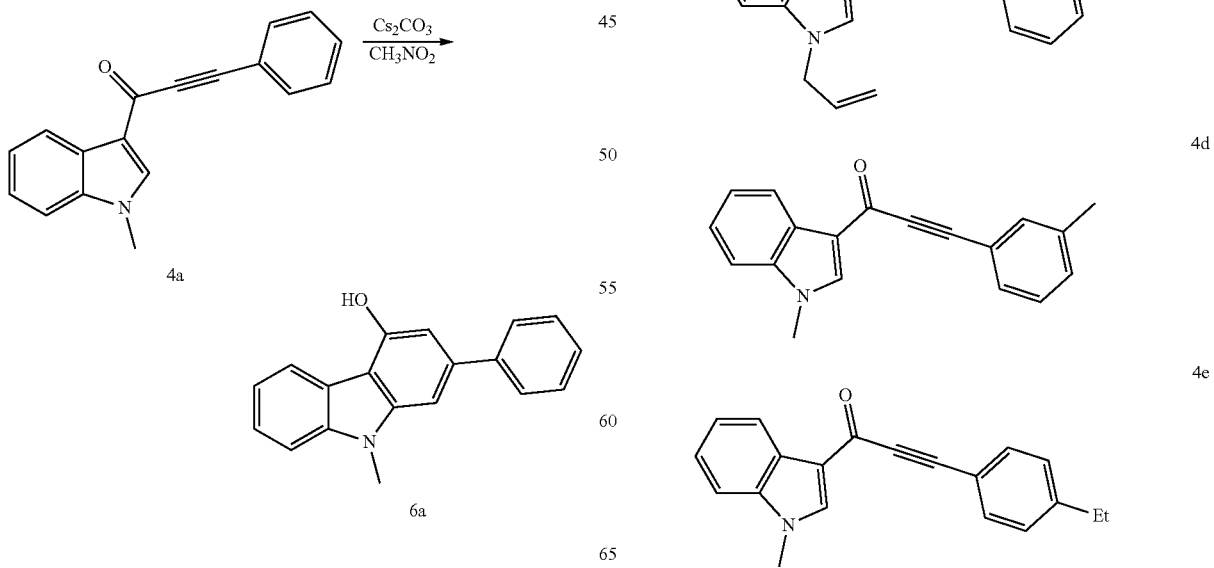

-continued

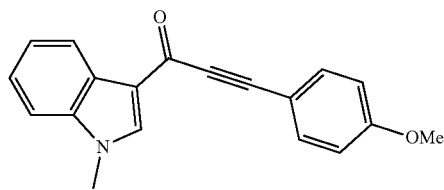 [SMILES: COc1ccc(C#CC(=O)c2cn(C)c3ccccc23)cc1]
4f

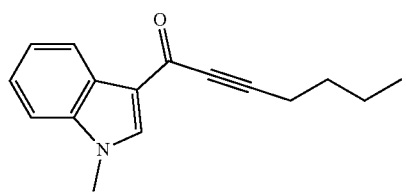 [SMILES: CCCCC#CC(=O)c1cn(C)c2ccccc12]
4g

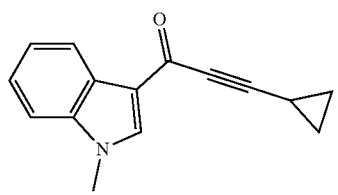 [SMILES: Cn1cc(C(=O)C#CC2CC2)c2ccccc21]
4h

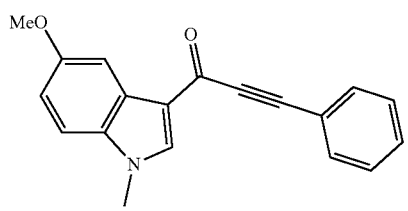 [SMILES: COc1ccc2c(c1)c(C(=O)C#Cc1ccccc1)cn2C]
4i

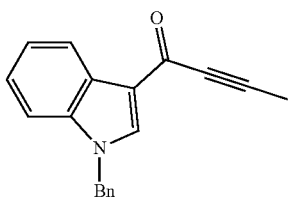 [SMILES: CC#CC(=O)c1cn(Cc2ccccc2)c2ccccc12]
4j

| Example | Reactant/ Compound (II) | Product/Compound (III) | M.P. (° C.) | Yield (%) |
|---|---|---|---|---|
| Example 2 | 4b | (6b) | 145-146 | 90 |
| Example 3 | 4c | (6c) | 105-106 | 85 |
| Example 4 | 4d | (6d) | 163-164 | 87 |
| Example 5 | 4e | (6e) | 171-172 | 89 |
| Example 6 | 4f | (6f) | 217-218 | 82 |
| Example 7 | 4g | (6g) | 111-112 | 78 |
| Example 8 | 4h | (6h) | 149-150 | 83 |
| Example 9 | 4i | (6i) | 164-166 | 85 |
| Example 10 | 4a | (6j) | 158-160 | 88 |
| Example 11 | 4a | (6k) | 127-128 | 90 |
| Example 12 | 4a | (6l) | 169-170 | 85 |
| Example 13 | 4j | (6m) | 101-102 | 89 |

In another embodiment, the representative compounds of Formula I are:

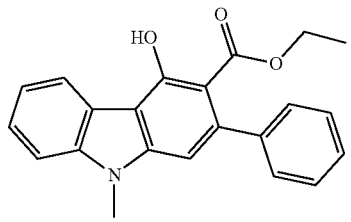
7a

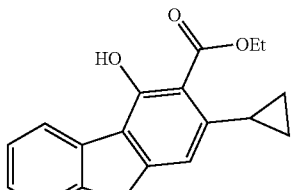
7b

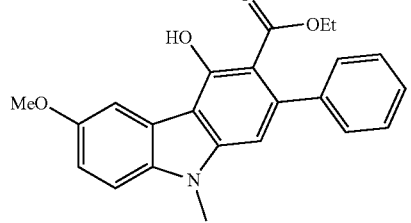
7c

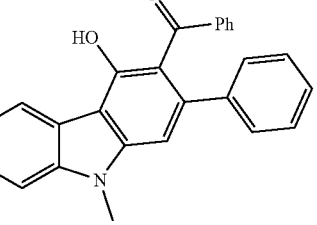
7d

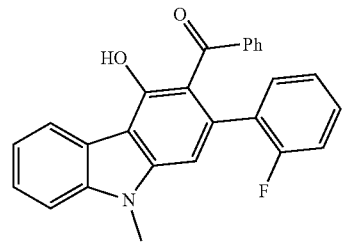
7e

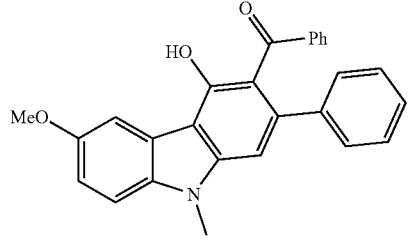
7f

The compound of formula (7a)-(7c) were synthesized following the procedure described above under example 1 and general procedure involving 4a, 4h, and 4i respectively corresponding reactants of formula II and ethylnitroacetate. The compound of formula (7d)-(7f) were synthesized following the procedure described above under example 1 and general procedure involving 4a, 4k, and 4i respectively corresponding reactants of formula II and benzoylnitromethane.

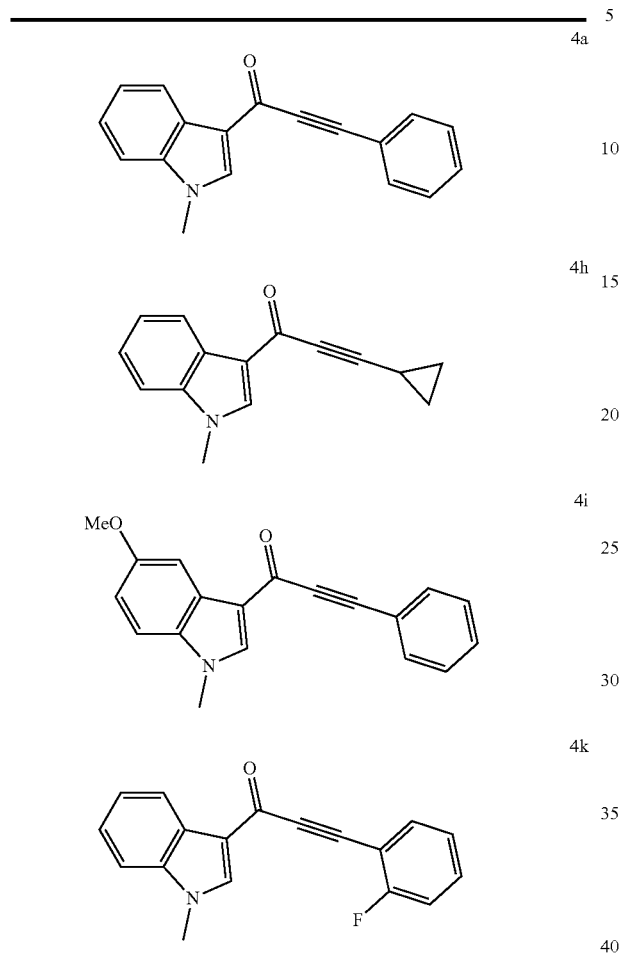

| Example | Reactant/Compound (II) | Product/Compound | M.P. (° C.) | Yield (%) |
|---|---|---|---|---|
| Example 14 | 4a | (7a) | 152-153 | 91 |
| Example 15 | 4h | (7b) | Viscous oil | 84 |
| Example 16 | 4i | (7c) | 135-137 | 81 |
| Example 17 | 4a | (7d) | 214-215 | 82 |
| Example 18 | 4k | (7e) | 201-203 | 85 |
| Example 19 | 4i | (7f) | 236-238 | 79 |

In yet another embodiment, the present invention provides access to nitro substituted carbazoles of formula I starting from chloro substituted indole-ynones on reaction with nitroalkane and substituted nitroalkanes.

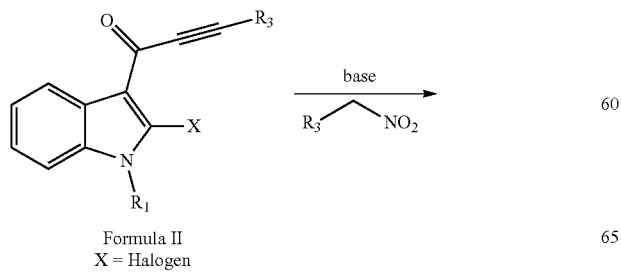

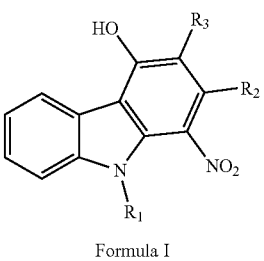

In another embodiment, the representative compounds of Formula I with nitro substitution are:

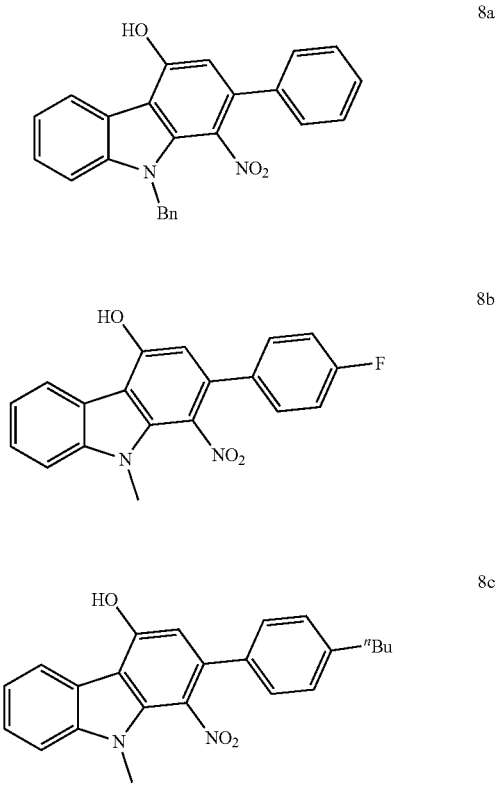

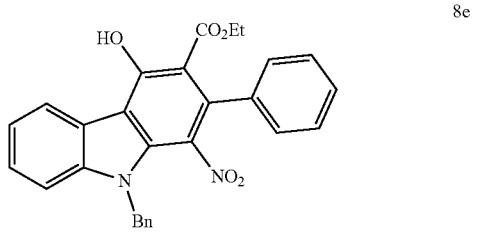

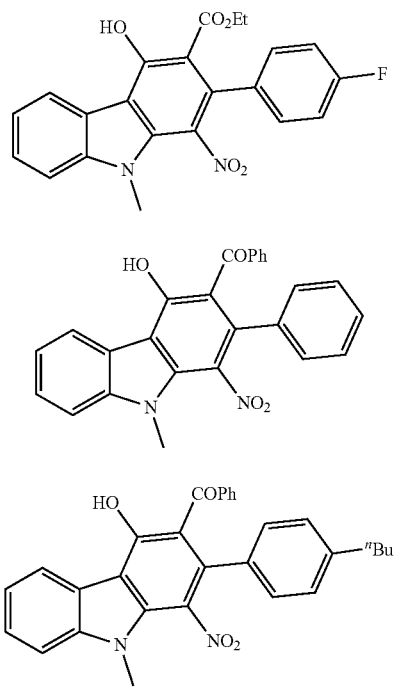

8f

8g

8h

The compound of formula (8a)-(8h) was synthesized following the procedure described above under example 1 and general procedure involving corresponding reactants of formula II and nitromethane or ethylnitroacetate or benzoyl nitromethane.

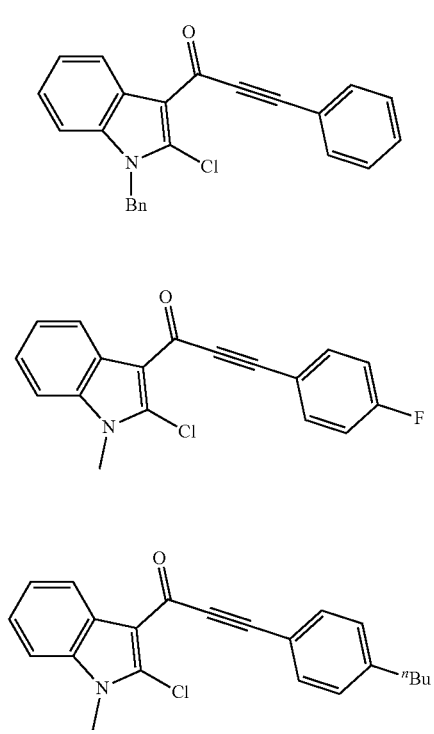

4l

4m

4n

4o

4p

| Example | Reactant/Compound (II) | Product/Compound | M.P. (° C.) | Yield (%) |
|---|---|---|---|---|
| Example 20 | 4l | (8a) | 147-148 | 87 |
| Example 21 | 4m | (8b) | 191-192 | 85 |
| Example 22 | 4n | (8c) | 187-188 | 81 |
| Example 23 | 4o | (8d) | 137-138 | 78 |
| Example 24 | 4l | (8e) | 178-179 | 84 |
| Example 25 | 4m | (8f) | 177-178 | 82 |
| Example 26 | 4p | (8g) | 183-184 | 80 |
| Example 27 | 4n | (8h) | 147-148 | 78 |

The invention also provides concise approach for the total synthesis of carbazomycin A from one of the above obtained products of formula I (6m) and is described as follows:

The carbazomycin A is isolated from *Streptromyces ehimense* H 1051-MY by Nakamura et al in 1980 and was found to display potent antibiotic properties. It is a structurally diverse 3,4-dioxygenated carbazole alkaloid. This newly developed process starts from four step sequence from the carbazole (6m) obtained via the new process employing benzoannulation of indole-alkynone with nitromethane. The present process can be performed very effectively in concise manner and in highly viable strategy which could be the most suitable for its large scale production of carbazomycin.

In yet another embodiment, the present invention provides, the preparation of carbazomycin A, comprising of four-step sequence starting from (6m) comprising of required dimethyl substitutions obtained from our process as described earlier. As a requisite, the phenolic hydroxy in 6m was protected as the corresponding methoxy ether 9 with dimethyl sulfate in presence of potassium carbonate. The compound (9) was then subjected to bromination with NBS in halogenated solvent in particular chloroform to get the brominated product (10). Treatment of aryl bromide (10) with sodium methoxide in presence of copper iodide furnished the dimethoxy product (11). Finally, compound (11) on N-debenzylation with Pd/C provided the target compound carbazomycin (A). The data of the synthesized product was found to be identical as that of the reported data for the natural product. The structure was also determined by its single crystal X-ray structure.

Example 28: 9-Benzyl-4-methoxy-1,2-dimethyl-9H-carbazole (9): To a stirring solution of carbazole 6m (151.0 mg, 0.5 mmol) in anhydrous acetone (5.0 mL) were added $K_2CO_3$ (104.0 mg, 0.75 mmol) and $Me_2SO_4$ (76 mg, 0.6 mmol). The resulting reaction mixture was heated at 80° C. for 3 h. After completion of the reaction, it was filtered through a short plug of celite and the filtrate was concentrated in rotavapour and purified by silica gel column chromatography to afford the methoxy protected carbazole 9 as pale yellow solid (151.0 mg, 96%). $R_f$=0.3 (20% EtOAc+Hexane); $^1$H NMR (400 MHz, CDCl$_3$) δ 8.36-8.32 (m, 1H), 7.34-7.16 (m, 6H), 7.09-7.02 (m, 2H), 6.55 (s, 1H), 5.70 (s, 2H), 4.05 (s, 3H), 2.41 (s, 3H), 2.41 (s, 3H); $^{13}$C NMR (101 MHz, CDCl$_3$) δ 153.8, 141.4, 141.3, 139.0, 135.5, 128.9, 127.1, 125.7, 124.6, 122.8, 122.6, 119.6, 111.7, 111.1, 108.4, 103.7, 55.4, 48.8, 21.6, 14.2; IR (neat): $\square_{max}$ 730, 996, 1165, 1223, 1327, 1456, 1591, 2841, 2959 cm$^{-1}$; HRMS (ESIMS) calcd. for C$_{22}$H$_{22}$NO [M+H]$^+$: calcd m/z 316.1701; found: 316.1699.

Example 29: 9-Benzyl-3-bromo-4-methoxy-1,2-dimethyl-9H-carbazole (10): To a stirring solution of carbazole 7 (100.0 mg, 0.32 mmol) in CHCl$_3$ (10 mL) at room temperature was added NBS (57.0 mg, 0.32 mmol) and stirred for 5 min, after completion of the reaction (monitored by TLC), the mixture was diluted with CH$_2$Cl$_2$ (10 mL) and H$_2$O (10 mL). Layers 5 were separated and the aqueous layer was extracted with CH$_2$Cl$_2$ (2×5 mL), the combined organic extract was dried over Na$_2$SO$_4$, volatiles were removed under reduced pressure and the resulted crude compound was purified by silica gel column chromatography to afford the bromo-carbazole 10 as yellow solid (105.6 mg, 84%). $R_f$=0.5 (20% EtOAc+Hexane); $^1$H NMR (400 MHz, CDCl$_3$) δ 8.28 (d, J=7.7 Hz, 1H), 7.39 (ddd, J=8.3, 7.3, 1.2 Hz, 1H), 7.32-7.19 (m, 5H), 7.08 (d, J=6.8 Hz, 2H), 5.66 (s, 2H), 4.06 (s, 3H), 2.54 (s, 3H), 2.51 (s, 3H); $^{13}$C NMR (101 MHz, CDCl$_3$) δ 150.3, 142.2, 140.6, 138.4, 134.8, 129.0, 127.3, 125.9, 125.6, 122.6, 121.2, 120.2, 116.4, 111.2, 109.0, 60.1, 49.2, 20.8, 16.0; IR (neat): $\square_{max}$ 751, 814, 1043, 1161, 1248, 1356, 1386, 1583, 2933 cm$^{-1}$; HRMS (ESIMS) calcd. For C$_{22}$H$_{21}$NOBr [M+H]$^+$: calcd m/z 394.0807; found: 394.0807.

Example 30: 9-Benzyl-3,4-dimethoxy-1,2-dimethyl-9H-carbazole (11): To a freshly prepared solution of NaOMe in MeOH were added bromo-carbazole 10 (100.0 mg, 0.25 mmol) in DMF (3.0 mL), CuI and the reaction mixture was heated at 120° C. for 18 h. After completion of the reaction filtered through a short plug of celite using EtOAC and the solution was washed with cold water, brine. The organic layer was dried over Na$_2$SO$_4$, volatiles were removed under reduced pressure and the resulted crude compound was purified by silica gel column chromatography to afford the dimethoxy-carbazole 11 as off white solid (72.0 mg, 82%). $^1$H NMR (400 MHz, CDCl$_3$) δ 8.32 (d, J=7.6 Hz, 1H), 7.37-7.19 (m, 6H), 7.11 (d, J=7.1 Hz, 2H), 5.68 (s, 2H), 4.13 (s, 3H), 3.89 (s, 3H), 2.45 (s, 3H), 2.34 (s, 3H); $^{13}$C NMR (101 MHz, CDCl$_3$) δ 146.0, 144.4, 142.2, 138.9, 137.5, 129.9, 128.9, 127.2, 125.7, 125.3, 122.5, 122.2, 119.5, 115.7, 114.8, 108.7, 61.0, 60.4, 49.1, 15.0, 13.1; IR (neat): $\square_{max}$ 744, 1087, 1213, 1506, 1540, 1650, 2356, 3158 cm$^{-1}$; HRMS (ESIMS) calcd. for C$_{23}$H$_{24}$NO$_2$ [M+H]$^+$: calcd m/z 346.1079; found: 346.1069.

Example 31: 3,4-dimethoxy-1,2-dimethyl-9H-carbazole (carbazomycin A) (1): To a solution of benzyl compound 11 (50.0 mg) in MeOH (5.0 mL) was added 10% Pd/C (50 mg) and hydrogen balloon pressure was applied and stirred for 6 h. After completion of the reaction, as indicated by the TLC, filtered through a short plug of silica gel with the aid of EtOAc. Volatiles were removed under reduced pressure and the resulted crude compound was purified by column chromatography afforded the natural product carbazomycin A (1), as pale brown solid (37.0 mg, 92%); $^1$H NMR (400 MHz, CDCl$_3$) δ 8.23 (d, J=7.8 Hz, 1H), 7.81 (s, 1H), 7.44-7.33 (m, 2H), 7.21 (t, J=7.3 Hz, 1H), 4.10 (s, 3H), 3.89 (s, 3H), 2.41 (s, 3H), 2.38 (s, 3H); $^{13}$C NMR (101 MHz, CDCl$_3$) δ 146.0, 144.5, 139.4, 136.5, 128.8, 125.1, 122.9, 122.6, 119.5, 114.5, 113.5, 110.3, 61.1, 60.6, 13.7, 12.7. IR (neat): $\square_{max}$ 1034, 1302, 1480, 2975, 3435 cm$^{-1}$; HRMS (ESIMS) calcd. For C$_{16}$H$_{18}$NO$_2$ [M+H]$^+$: calcd m/z 256.0974; found: 256.0968.

The invention also provides concise approach for the total synthesis of calothrixin B from one of the above obtained products of formula I as the starting material and is described as follows:

The unique pentacyclic alkaloid, calothrixin B is isolated from calothrix cyanobacteria and is found to display antimalarial and antiproliferative properties. This natural product is synthesized from the substituted carbazole 8a obtained from the new process of benzoannulation of chlorosubstituted indole-ynone and nitromethane.

In yet another embodiment, the present invention provides the preparation of calothrixin B, comprising of six step synthesis starting from (8a).

Thus, (8a) was treated with MOMCl and DIPEA to get the corresponding MOM ether (12). The compound (12) was subjected to Cadogan cyclization upon treatment with thiethylphoshite under monowave condition to deliver the indolocarbazole (13). Compound (13) was subjected to Vilsmeier-Haack formylation reaction to get the aldehyde (14). The secondary amine in (14) was protected as the corresponding MOM derivative (15) with DIPEA and MOMCl in 88% yield. Cericammonium nitrate (CAN) mediated one-pot oxidative deprotection of MOM groups in (15) and further intramolecular cyclization of resulting free NH$_2$ and aldehyde provided the known phenanthridine moiety (16). The compound 16 was subjected to the process of debenzylation known in the prior art with AlCl$_3$ in anisole to yield N-debenzylated target natural product calothrixin B in decent yield. The data of the synthesized product was in good agreement with that of the reported data of natural product.

Example 32: 9-Benzyl-4-(methoxymethoxy)-1-nitro-2-phenyl-9H-carbazole (12): To a stirring solution of carbazole 8a (mmol) in dichloromethane at 0° C. were added DIPEA (mmol) and MOMCl, the solution was warmed to room temperature and stirred for 3 h. After completion of the reaction as indicated by TLC, diluted with dichloromethane and H$_2$O, layers were separated and the aqueous layer was extracted with dichloromethane (3×10 mL). The combined organic layer was dried over Na$_2$SO$_4$ and volatiles were removed under reduced pressure to give the crude compound, which was purified by silica gel column chromatography to afford the MOM compound 12 as bright yellow solid (152 mg, 91%). mp 153-154° C. $R_f$=0.5 (20% EtOAc+Hexane); $^1$H NMR (500 MHz, CDCl$_3$) δ 8.44 (d, J=7.8 Hz, 1H), 7.48 (ddd, J=8.3, 7.2, 1.2 Hz, 1H), 7.37 (dddd, J=14.9, 11.9, 6.9, 2.0 Hz, 7H), 7.24-7.16 (m, 3H), 7.05-6.98 (m, 2H), 6.88 (s, 1H), 5.52 (s, 2H), 5.46 (s, 2H), 3.60 (s, 3H); $^{13}$C NMR (126 MHz, CDCl$_3$) δ 153.7, 141.8, 137.9, 136.6, 134.7, 132.1, 130.7, 128.7, 128.5, 128.3, 128.2, 127.6, 126.6, 126.1, 123.4, 121.3, 121.1, 114.9, 109.5, 107.0, 94.6, 56.7, 47.7; HRMS (ESIMS) calcd. For C$_{27}$H$_{23}$N$_2$O$_4$ [M+H]$^+$: calcd m/z 439.1658; found: 439.1647.

Example 33: 12-Benzyl-5-(methoxymethoxy)-11,12-dihydroindolo[2,3-a]carbazole (13): In a 10 mL monowave glass vial, compound 12 (120 mg) was taken in 1,2-dichlorobenzene (1 mL) and added triethylphosphite (1 mL), closed with silicone cap and heated up to 180° C. for 180 min (2×90 min) in monowave 50 (Anton paar) reactor. The reaction mixture was purified by column chromatography (15% EtOAc+Hexane) to afford indolo-carbazole 13 as dark brown solid (83 mg, 75%). mp 144-145° C. $R_f$=0.3 (20%

EtOAc+Hexane); $^1$H NMR (500 MHz, DMSO) δ 11.36 (s, 1H), 8.37 (d, J=7.7 Hz, 1H), 8.13 (d, J=7.8 Hz, 1H), 7.62 (t, J=4.1 Hz, 2H), 7.57 (d, J=8.1 Hz, 1H), 7.42-7.34 (m, 2H), 7.28-7.15 (m, 7H), 6.11 (s, 2H), 5.60 (s, 2H), 3.56 (s, 3H). $^{13}$C NMR (126 MHz, DMSO) δ 147.53, 140.57, 139.67, 138.90, 129.06, 128.02, 127.70, 127.15, 125.24, 124.75, 123.66, 123.31, 122.62, 122.06, 120.80, 120.09, 119.22, 112.08, 111.88, 110.23, 95.87, 95.00, 56.42, 47.78.; IR (neat): $\square_{max}$ 753, 1019, 1156, 1454, 2948, 3422, 3885 cm$^{-1}$; HRMS (ESIMS) calcd. For $C_{27}H_{23}N_2O_2$ [M+H]$^+$: calcd m/z 407.1760; found: 407.1751.

11-Benzyl-6-(methoxymethoxy)-12-(methoxymethyl)-11,12-dihydroindolo[2,3-a]carbazole-5-carbaldehyde (15): To a stirring solution of DMF and POCl$_3$ at 0° C. was added indolo-carbazole 13 in DMF. The reaction mixture was warmed to room temperature and stirred for 3 h. After completion of the reaction diluted with water and EtOAc, layers were separated and aqueous layer was extracted with EtOAc (3×10 mL). The combined organic extract was washed with sat. NaHCO$_3$ solution and dried over Na$_2$SO$_4$, volatiles were removed under reduced pressure gave crude compound, which was purified by silica gel flash column chromatography to afford the aldehyde compound 14. This compound was directly subjected to N-MOM protection. To a stirring solution of aldehyde 14 (mmol) in dichloromethane at 0° C. were added DIPEA (mmol) and MOMCl, the solution was warmed to room temperature and stirred for 3 h. After completion of the reaction as indicated by TLC, diluted with dichloromethane and H$_2$O, layers were separated and the aqueous layer was extracted with dichloromethane (3×10 mL). The combined organic layer was dried over Na$_2$SO$_4$ and volatiles were removed under reduced pressure to give the crude compound, which was purified by silica gel column chromatography to afford the di-MOM compound 15 as pale brown solid (70 mg, 85%); R$_f$=0.5 (20% EtOAc+Hexane); mp 130-132° C.; $^1$H NMR (400 MHz, CDCl$_3$) δ 10.91 (s, 1H), 9.17 (d, J=8.2 Hz, 1H), 8.45-8.32 (m, 1H), 7.56-7.47 (m, 2H), 7.45-7.31 (m, 8H), 7.24-7.17 (m, 1H), 5.86 (s, 2H), 5.46 (s, 2H), 5.22 (s, 2H), 3.70 (s, 3H), 2.89 (s, 3H). $^{13}$C NMR (101 MHz, CDCl$_3$) δ 190.64, 154.53, 145.28, 143.35, 136.95, 134.47, 129.02, 127.61, 127.15, 126.26, 126.22, 126.01, 125.75, 124.97, 123.51, 122.58, 122.17, 122.01, 121.58, 118.99, 116.46, 111.82, 110.84, 101.65, 79.24, 58.60, 55.35, 50.80; IR (neat): $\square_{max}$ 752, 962, 1078, 1172, 1256, 1336, 1449, 1600, 1716, 2938 cm$^{-1}$; HRMS (ESIMS) calcd. For $C_{30}H_{27}N_2O_4$ [M+H]$^+$: calcd m/z 479.1971; found: 479.1966.

12-Benzyl-7H-indolo[3,2-j]phenanthridine-7,13(12H)-dione (16): To a solution of diMOM compound 15 (50 mg, 0.1 mmol) in 1 mL of acetonitrile and H$_2$O (10:1) was added CAN (cerium ammonium nitrate, 165 mg, 0.3 mmol) and the reaction mixture was stirred at room temperature for 14 h. After completion of the reaction diluted with EtOAc (10 mL) and H$_2$O (5 mL), layers were separated; the aqueous layer was extracted with EtOAc (3×5 mL). The combined organic extract was washed with 1N NaOH (5 mL), the resulted organic layer was dried over Na$_2$SO$_4$ and volatiles were removed under reduced pressure to give crude compound, which upon purification by silica gel column chromatography (15% EtOAc+Hexane) afforded the di-MOM compound 16 as orange solid (28 mg, 69%) (compound known in the prior art (Org. Lett. 2017, 19, 2785-2788); mp 262-263° C.; R$_f$=0.4 (20% EtOAc+Hexane); $^1$H NMR (500 MHz, CDCl$_3$) δ 9.79 (s, 1H), 9.54 (d, J=8.7 Hz, 1H), 8.45 (d, J=7.3 Hz, 1H), 8.18 (d, J=8.3 Hz, 1H), 7.86-7.78 (m, 1H), 7.77-7.68 (m, 1H), 7.50-7.38 (m, 3H), 7.36-7.18 (m, 5H), 6.00 (s, 2H); $^{13}$C NMR (126 MHz, CDCl$_3$) δ 182.06, 181.07, 152.20, 147.92, 140.17, 136.25, 135.19, 133.33, 131.43, 130.38, 130.15, 128.95, 128.05, 127.91, 127.72, 126.64, 125.21, 124.53, 123.98, 123.34, 123.18, 117.75, 111.61, 48.59; IR (neat): $\square_{max}$ 764, 1302, 1461, 1708, 2855, 2923 cm$^{-1}$; HRMS (ESIMS) calcd. For $C_{26}H_{17}N_2O_2$ [M+H]$^+$: calcd m/z 389.1290; found: 389.1284.

7H-Indolo[3,2-j]phenanthridine-7,13(12H)-dione, Calothrixin B 3 (2)

To a solution of AlCl$_3$ (65 mg, 0.5 mmol) in anisole (0.5 mL) at 0° C. was added a solution of compound 16 (20 mg, 0.05 mmol) in anisole (0.5 mL), the reaction mixture was heated at 80° C. for 8 h. After completion of the reaction (by TLC) cooled to room temperature, filtered through celite with the aid of EtOAc and the volatiles were removed under reduced pressure and the crude compound was purified by column chromatography (20% EtOAc+Hexane) to afford calothrixin B, 3 as orange solid (Org. Lett. 2017, 19, 2785-2788). (10.7 mg, 72%). R$_f$=0.3 (20% EtOAc+Hexane); mp 298-300° C.; $^1$H NMR (400 MHz, DMSO) δ 13.16 (s, 1H), 9.63 (s, 1H), 9.59 (d, J=8.6 Hz, 1H), 8.18 (dd, J=7.7, 4.6 Hz, 2H), 8.00-7.93 (m, 1H), 7.93-7.86 (m, 1H), 7.63 (d, J=8.2 Hz, 1H), 7.51-7.45 (m, 1H), 7.40 (t, J=7.1 Hz, 1H); $^{13}$C NMR (101 MHz, DMSO) δ 180.9, 180.4, 151.2, 147.5, 138.4, 138.1, 132.7, 131.6, 130.3, 129.8, 127.2, 127.2, 124.9, 124.3, 123.7, 122.6, 122.3, 115.5, 114.0; IR (neat): $\square_{max}$ 987, 1076, 1437, 1648, 2949, 3458 cm$^{-1}$; HRMS (ESIMS) calcd. For $C_{19}H_{11}N_2O_2$ [M+H]$^+$: calcd m/z 299.0821; found: 299.0819.

The invention also provides concise approach for the total synthesis of staurosporinone from one of the above obtained products 8e of formula III as the starting material and is described as follows:

The indolocarbazole alkaloid k-252c named as staurosporinone was isolated in 1986 from culture broths of Nocardiopsis sp K-252 and Nocardiopsis Sp. K-290. This compound is known to be potent inhibitor of protein kinase C. The aglycone of staurosporine, staurosporinone has attracted significant attention from chemists because of the interesting biological activity and novel functional pattern of the hexasubstituted arene framework. Some of the key synthetic methods for its preparation from literature involve metal catalyzed C—H amination and C—H carbonylation reactions along with several other key reactions. The natural product is prepared starting from nitro-substituted carbazole synthesized from our developed process in further five simple steps.

In yet another embodiment, the present invention provides the preparation of staurosporinone starting from carbazole 8e synthesized earlier and comprises of five step sequence.

Accordingly, the phenolic hydroxy in compound 8e was activated by converting it to triflate 17 and then treated with zinc cyanide in presence of copper (II) iodide and tetrakistriphenylphosphine palladium to afford the cyanated nitro carbazole 18. Cadagon cyclization of 18 with triethylphosphite under monowave conditions delivered the pentacyclic indolocarbazole 19. One-pot reduction of cyanide to amine followed by lactam formation with adjacent ester moiety was achieved with Raney Ni in DMF and methanol as solvent from 19 leading to the core skeleton 20 with benzyl appendage on nitrogen atom of staurosporinone. Finally, N-debenzylation of 20 with AlCl$_3$ in anisole furnished the target natural product in good yield. The analytical data of the synthesized product was in good agreement with that of the data of the reported natural product.

Example 34: Ethyl 9-benzyl-1-nitro-2-phenyl-4-(((trifluoromethyl)sulfonyl)oxy)-9H-carbazole-3-carboxylate (17): To a stirring solution of carbazole 8e (150.0 mg, 0.32 mmol) in dichloromethane (5.0 mL) at 0° C. were added pyridine (40.0 □L, 0.48 mmol) and Tf$_2$O (70.0 □L, 0.42 mmol), the reaction was warmed to room temperature and was allowed to stir for 3 h. After completion of the reaction (monitored by TLC) it was diluted with dichloromethane (5.0 mL), quenched by the addition of sat·aq. NaHCO$_3$ (1.0 mL), H$_2$O (5.0 mL), layers were separated and the aqueous layer was extracted with dichloromethane (2×5 mL). The combined organic extract was dried over Na$_2$SO$_4$ and the volatiles were removed under reduced pressure to give the crude compound, which was purified by silica gel column chromatography (25% EtOAc+Hexane) to yield the triflate compound 17 as pale yellow solid (177.0 mg, 92%). $R_f$=0.5 (40% EtOAc+Hexane); mp: 145-147° C.; $^1$H NMR (400 MHz, CDCl$_3$) δ 8.46 (d, J=8.0 Hz, 1H), 7.65-7.59 (m, 1H), 7.49-7.43 (m, 2H), 7.40-7.33 (m, 3H), 7.30 (dt, J=3.8, 2.1 Hz, 2H), 7.27-7.22 (m, 3H), 6.98 (dd, J=6.8, 2.8 Hz, 2H), 5.44 (s, 2H), 3.95 (q, J=7.2 Hz, 2H), 0.86 (t, J=7.2 Hz, 3H); $^{13}$C NMR (101 MHz, CDCl$_3$) δ 163.9, 142.7, 139.9, 135.4, 133.7, 132.6, 131.8, 129.2, 129.0, 129.9, 128.9, 128.2, 128.0, 127.6, 125.7, 123.4, 122.4, 120.2, 119.7, 119.2, 110.4, 62.0, 47.6, 13.3; IR (neat): □$_{max}$ 751, 841, 1233, 1377, 1488, 1595, 2201 cm$^{-1}$; HRMS (ESIMS) calcd. For C$_{29}$H$_{22}$N$_2$O$_7$F$_3$S [M+H]$^+$: calcd m/z 599.1100; found: 599.1108.

Example 35: Ethyl 9-benzyl-4-cyano-1-nitro-2-phenyl-9H-carbazole-3-carboxylate (18): To a stirring solution of triflate 17 (150.0 mg, 0.25 mmol) in DMF (3.0 mL) were added Pd(PPh$_3$)$_4$ (29.0 mg, 0.025) and Zn(CN)$_2$ (88.0 mg, 0.75 mmol), the reaction mixture was heated at 120° C. for 18 h. After completion of the reaction, solids were filtered, the filtrate was diluted with cold H$_2$O and was extracted with EtOAc (3×5 mL), the combined organic extract was dried over Na$_2$SO$_4$ and volatiles were removed under reduced pressure to give the crude compound, which was purified by silica gel column chromatography (30% EtOAc+Hexane) to afford the cyano compound 18 as orange solid (102.0 mg, 86%). $R_f$=0.3 (40% EtOAc+Hexane); mp: 188-190° C.; $^1$H NMR (500 MHz, CDCl$_3$) δ 8.83 (d, J=8.0 Hz, 1H), 7.70-7.61 (m, 1H), 7.51-7.45 (m, 2H), 7.42-7.34 (m, 3H), 7.31-7.28 (m, 2H), 7.24 (dt, J=6.8, 2.8 Hz, 3H), 6.98-6.93 (m, 2H), 5.45 (s, 2H), 4.12 (q, J=7.1 Hz, 2H), 1.00 (t, J=7.1 Hz, 3H); $^{13}$C NMR (126 MHz, CDCl$_3$) δ 165.2, 143.4, 137.6, 135.3, 133.2, 131.3, 130.0, 129.9, 129.5, 129.2, 128.9, 128.30 128.1, 127.3, 125.7, 122.5, 122.4, 120.0, 115.7, 110.4, 104.8, 62.5, 47.5, 13.5; IR (neat): □$_{max}$ 751, 1222, 1267, 1538, 1728, 2231 cm$^{-1}$; HRMS (ESIMS) calcd. For C$_{29}$H$_{22}$N$_3$O$_4$ [M+H]$^+$: calcd m/z 476.1610; found: 476.1591.

Example 36: Ethyl 11-benzyl-6-cyano-11,12-dihydroindolo[2,3-a]carbazole-5-carboxylate (19): In a 10 mL monowave glass vial, compound 18 (100.0 mg) was taken in 1,2-dichlorobenzene (0.5 mL) and added triethylphosphite (0.5 mL), closed with silicone cap and heated up to 180° C. for 180 min (2×90 min) in monowave 50 (Anton paar) reactor. After completion of the reaction it was directly purified by column chromatography (25-35% EtOAc+Hexane) to afford indolo-carbazole 19 as light brown solid (70.0 mg, 75%) and 27 (20 mg, 19%). $R_f$=0.5 (50% EtOAc+Hexane); mp: 282-282° C.; $^1$H NMR (400 MHz, DMSO) δ 12.27 (s, 1H), 8.64 (d, J=8.0 Hz, 1H), 8.09 (d, J=8.1 Hz, 1H), 7.81 (d, J=8.3 Hz, 1H), 7.75 (d, J=8.1 Hz, 1H), 7.57 (dt, J=14.8, 7.4 Hz, 2H), 7.43 (t, J=7.5 Hz, 1H), 7.33 (t, J=7.5 Hz, 1H), 7.19 (ddd, J=25.5, 16.1, 6.9 Hz, 5H), 6.24 (s, 2H), 4.68 (q, J=7.1 Hz, 2H), 1.49 (t, J=7.1 Hz, 3H); $^{13}$C NMR (101 MHz, DMSO) δ 167.2, 141.2, 141.1, 138.1, 129.2, 127.9, 127.6, 127.5, 127.3, 127.0, 124.5, 122.0, 121.7, 121.4, 121.1, 121.0, 120.6, 119.12, 118.5, 118.4, 112.9, 111.6, 93.8, 62.8, 48.0, 14.4; IR (neat): □$_{max}$ 758, 1024, 1226, 1458, 1542, 1731, 2857, 2925 cm$^{-1}$; HRMS (ESIMS) calcd. For C$_{29}$H$_{22}$N$_3$O$_2$ [M+H]$^+$: calcd m/z 444.1712; found: 444.1703.

Example 37: 12-Benzyl-6,7,12,13-tetrahydro-5H-indolo[2,3-a]pyrrolo[3,4-c]carbazol-5-one (20): To a suspension of Raney Ni (100 mg) in MeOH (1 mL) was added cyano-ester compound 19 (40.0 mg) in 3 mL MeOH-DMF (1:3) and kept under the balloon pressure of H$_2$ gas for 24 h. After completion of the reaction (by TLC) cooled to room temperature, filtered through celite with the aid of EtOAc and the volatiles were removed under reduced pressure and the crude compound was purified by column chromatography (30-40% EtOAc+Hexane) to afford 20 as light brown solid. (26.0 mg, 72%); mp: >300° C.; $R_f$=0.3 (50% EtOAc+Hexane); $^1$H NMR (500 MHz, DMSO) δ 11.81 (s, 1H), 9.33 (d, J=7.9 Hz, 1H), 8.55 (s, 1H), 8.07 (d, J=7.7 Hz, 1H), 7.75 (d, J=8.3 Hz, 1H), 7.66 (d, J=8.1 Hz, 1H), 7.48 (t, J=7.3 Hz, 1H), 7.44-7.39 (m, 1H), 7.33 (t, J=7.4 Hz, 1H), 7.24-7.14 (m, 6H), 6.24 (s, 2H), 5.00 (s, 2H); $^{13}$C NMR (101 MHz, DMSO) δ 172.7, 140.7, 140.5, 138.7, 133.5, 129.3, 129.0, 127.7, 127.1, 125.7, 125.2, 123.0, 122.7, 121.8, 120.9, 119.8, 119.5, 117.7, 114.9, 112.0, 111.0, 47.9, 45.8; IR (neat): □$_{max}$ 765, 1332, 1450, 1658, 2505, 2954, 3221, 3327 cm$^{-1}$; HRMS (ESIMS) calcd. For C$_{27}$H$_{20}$N$_3$O [M+H]$^+$: calcd m/z 402.1606; found 402.1603.

Example 38: 6,7,12,13-Tetrahydro-5H-indolo[2,3-a]pyrrolo[3,4-c]carbazol-5-one (3): To a solution of AlCl$_3$ (66 mg, 0.5 mmol) in anisole (0.5 mL) at 0° C. was added a solution of compound 20 (20.0 mg, 0.05 mmol) in anisole (0.5 mL), further the reaction mixture was heated at 110° C. for 1 h. After completion of the reaction (by TLC), it was cooled to room temperature, filtered through celite with the aid of EtOAc and the volatiles were removed under reduced pressure and the crude compound was purified by column chromatography (40-50% EtOAc+Hexane) to afford staurosporinone 3 as brownish-red solid (14.8 mg, 95%). $R_f$=0.2 (50% EtOAc+Hexane); mp>300° C.; $^1$H NMR (400 MHz, DMSO-d6) δ 11.60 (s, 1H), 11.42 (s, 1H), 9.23 (d, J=7.9 Hz, 1H), 8.48 (s, 1H), 8.05 (d, J=7.7 Hz, 1H), 7.79 (d, J=8.1 Hz, 1H), 7.72 (d, J=8.1 Hz, 1H), 7.46 (dt, J=19.7, 7.4 Hz, 2H), 7.31 (t, J=7.4 Hz, 2H), 7.23 (t, J=7.3 Hz, 1H), 4.97 (s, 2H); $^{13}$C NMR (101 MHz, DMSO-d6) δ 172.4, 139.2, 139.0, 132.9, 127.9, 125.4, 125.2, 125.0 (2C), 122.8, 122.6, 121.1, 119.9, 118.9 (2C), 115.6, 114.1, 111.9, 111.3, 45.3; IR (neat): □$_{max}$ 760, 1245, 1381, 1456, 1647, 1731, 2856, 2922 cm$^{-1}$; HRMS (ESIMS) calcd. For C$_{20}$H$_{14}$N$_3$O [M+H]$^+$: calcd m/z 312.1137; found 312.1135.

Preparation of Indole-Ynones of Formula II (X=H)

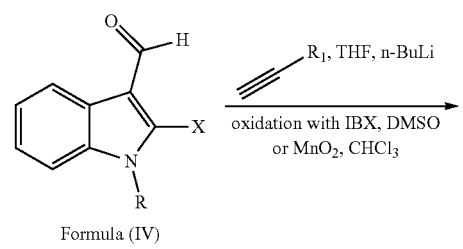

Formula (IV)

-continued

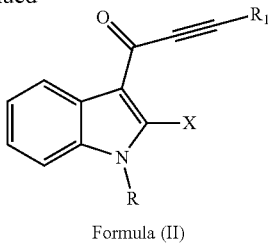

Formula (II)

R=Me, Bn, R$_1$=Me, Ph, 3-methyl phenyl, 4-ethyl phenyl, 4-OMe-phenyl, C$_1$-C$_6$ alkyl, cyclopropyl.

General Preparation of Compound of Formula IV

A solution of N,N-dimethylformamide (90.0 mmol) in dichloromethane (50.0 mL) at 0° C. was slowly treated with POCl$_3$ (75.0 mmol) and stirred for 1 h. A solution of oxindole (30.0 mmol) in dichloromethane (30.0 mL) was added to the reaction mixture and the reaction stirred for 24 h at 25° C. The reaction was quenched by pouring it into ice bath and adding NaHCO$_3$ until a pH of 7 was reached. The solution was allowed to warm to room temperature and was extracted with dichloromethane (3×50 mL). The combined organic layers were washed with saturated aq. NaHCO$_3$, brine, and H$_2$O. The organic phase was dried over Na$_2$SO$_4$, filtered, and concentrated in vacuo. The residue was purified by flash chromatography (1:4 EtOAc/hexane) to afford 2-Chloro-Indole-3-carbaldehyde. The free NH was protected as methyl or benzyl using methyl iodide or benzyl bromide. To a stirred solution of 2-Chloro-Indole-3-carbaldehyde (5 mmol) in acetonitrile (20 mL) at 0° C. were added NaH (6 mmol) and stirred for 30 min. To this alkyl halide (6 mmol) was added and stirred at room temperature for 3 h. After completion of the reaction quenched by adding H$_2$O (5 mL) drop wise further 15 mL of water is added, diluted with EtOAc (20 mL) and the layers were separated, the aqueous layer was extracted with EtOAc (3×20 mL). The combined organic layers were washed with saturated brine solution. The organic phase was dried over Na$_2$SO$_4$, filtered, and concentrated in vacuo. The residue was purified by flash chromatography (1:5 EtOAc/hexane) to afford N-substituted 2-Chloro-Indole-3-carbaldehyde.

General procedure 2 for the preparation of ynones (4c to 4p) of formula II utilized for synthesis of representative carbazoles:

| Example | Product/Compound | M.P. (° C.) | Yield (%) |
|---|---|---|---|
| Example 39 | (4c) | 79-80 | 72 |
| Example 40 | (4d) | — | 81 |
| Example 41 | (4e) | 142-144 | 75 |
| Example 42 | (4f) | 132-134 | 75 |
| Example 43 | (4g) | — | 76 |
| Example 44 | (4h) | 78-80 | 79 |
| Example 45 | (4i) | 130-132 | 77 |
| Example 46 | (4j) | — | 88 |
| Example 47 | (4k) | 84-85 | 73 |
| Example 48 | (4l) | 162-164 | 75 |
| Example 49 | (4m) | 102-103 | 71 |
| Example 50 | (4n) | — | 68 |
| Example 51 | (4o) | — | 74 |
| Example 52 | (4p) | 99-100 | 72 | n-BuLi (1.1 mmol) was added to a stirring solution of alkyne (1.2 mmol) in anhydrous THF (5 mL) at −78° C., and the resulting reaction mixture was stirred for another 15 min. at the same temperature. To this aldehyde (1 mmol) in THF (5 mL) was added drop wise and allowed to warm to room temperature and the reaction was monitored by TLC. After complete consumption of the starting material (monitored by TLC), the reaction mixture was quenched by drop wise addition of saturated aq. NH$_4$Cl (50 mL) solution and diluted with H$_2$O (10 mL) and EtOAc (10 mL). The layers were separated and the aqueous layer was extracted with EtOAc (2×10 mL). The combined organic layer was washed with brine solution and dried over anhydrous Na$_2$SO$_4$, concentrated under reduced pressure to afford the crude propargyl alcohol, which was used for oxidation directly. To a stirred solution of secondary alcohol (1 mmol) in DMSO (5 mL) at room temperature was added IBX (1.2 mmol) and the reaction mixture was stirred for 2 h. After complete consumption of the starting material (monitored by TLC), the reaction mixture was filtered through celite with the aid of EtOAc and the resulting filtrate was washed with cold H$_2$O (10 mL×2) and brine solution (10 mL) and the organic layer was dried over anhydrous Na$_2$SO$_4$. Volatiles were removed under reduced pressure and the obtained crude mixture was purified by silica gel column chromatography to yield the substituted ynones.

1-(1-Methylindol-3-yl)-3-phenylprop-2-yn-1-one (4a). To a two-neck round bottomed flask equipped with a stir bar was added phenyl acetylene (11.2 mmol, 1.14 g) and THF (7 mL). The stirred solution was cooled to 0° C. and flushed with argon. To this reaction mixture was added dropwise, n-BuLi (2.5 M in hexanes, 4.5 mL, 11.2 mmol) and the mixture was allowed to stir for 30 min at 0° C. N-Methyl-3-indolecarboxaldehyde (9.3 mmol, 1.48 g) in THF (5 mL) was added dropwise and allowed to stir for 1 h at 0° C. After completion, the reaction was quenched with saturated aq. NH$_4$Cl solution and extracted with diethylether. The organic layers were combined, dried and concentrated under reduced pressure.

(oxidation with MnO$_2$): The residue (alcohol) was dissolved in chloroform (10 mL) and MnO$_2$ (27.9 mmol, 2.43 g) was added to the solution. The suspension was refluxed for 1 h, the solution was cooled and filtered through a pad of celite, and the filtrate was concentrated. The residue was purified by column chromatography on silica gel to afford 1.24 g of the product.

Oxidation with IBX: To the solution of alcohol in DMSO (10 mL) was added IBX (11.2 mmol) and stirred at room temperature for 2 h. The mixture was quenched with water, extracted with diethyl ether and dried over anhydrous Na$_2$SO$_4$, filtered and concentrated under reduced pressure as a pale yellow solid: mp 112-114° C.; $^1$H NMR (CDCl$_3$) δ 3.81 (s, 3H), 7.29-7.43 (m, 6H), 7.61-7.64 (d, J=7.2 Hz, 2H), 7.89 (s, 1H), 8.39-8.42 (m, 1H); $^{13}$C NMR δ 33.8, 87.8, 88.0, 110.1, 118.5, 120.9, 122.5, 123.2, 124.0, 125.9, 128.7, 130.2, 132.8, 137.9, 139.1, 171.3; IR (neat, cm-1) 3057, 1605.

1-(1-Allyl-1H-indol-3-yl)-3-phenylprop-2-yn-1-one (4c): By following the general procedure 2 using 1-allyl-1H-indole-3-carbaldehyde and phenylacetylene, ynone 4c was prepared as light brown solid (205 mg, 72%).

1-(1-Methyl-1H-indol-3-yl)-3-(m-tolyl)prop-2-yn-1-one (4d): By following the general procedure 2 using 1-methyl-1H-indole-3-carbaldehyde and 3-methyl phenylacetylene, ynone 4d was prepared as brown viscous oil (221 mg, 81%).

3-(4-Ethylphenyl)-1-(1-methyl-1H-indol-3-yl)prop-2-yn-1-one (4e): By following the general procedure 2 using 1-methyl-1H-indole-3-carbaldehyde and 4-ethyl phenylacetylene, ynone 4e was prepared as light brown solid (215 mg, 75%).

3-(4-Methoxyphenyl)-1-(1-methyl-1H-indol-3-yl)prop-2-yn-1-one (4f): By following the general procedure 2 using 1-methyl-1H-indole-3-carbaldehyde and 4-methoxy phenylacetylene, ynone 4f was prepared as light brown solid (217 mg, 75%).

1-(1-Methyl-1H-indol-3-yl)hept-2-yn-1-one (4g): By following the general procedure 2 using 1-methyl-1H-indole-3-carbaldehyde and 1-hexyne, ynone 4g was prepared as pale yellowish oil (181.5 mg, 76%).

3-Cyclopropyl-1-(1-methyl-1H-indol-3-yl)prop-2-yn-1-one (4h): By following the general procedure 2 using 1-methyl-1H-indole-3-carbaldehyde and cyclopropyl acetylene, ynone 4h was prepared as light brown solid (176.2 mg, 79%).

1-(5-Methoxy-1-methyl-1H-indol-3-yl)-3-phenylprop-2-yn-1-one (4i): By following the general procedure 2 using 5-methoxy-1-methyl-1H-indole-3-carbaldehyde and phenylacetylene, ynone 4i was prepared as dark brown solid (222 mg, 77%).

1-(1-Benzyl-1H-indol-3-yl)but-2-yn-1-one (4j): To a solution of 1-benzyl indole-3-carbaldehyde (235 mg, 1 mmol) in THF (3 mL) at −20° C. was added 1-propynyl magnesium bromide (2.2 mL, 1.1 mmol, 0.5 M in THF) drop wise and stirred for 1 h. After complete consumption of the starting material (monitored by TLC), the reaction mixture was quenched by drop wise addition of saturated aq. $NH_4Cl$ (10 mL) solution and diluted with $H_2O$ (30 mL) and EtOAc (20 mL). The layers were separated and the aqueous layer was extracted with EtOAc (3×20 mL). The combined organic layer was washed with brine solution and dried over anhydrous $Na_2SO_4$, concentrated under reduced pressure to afford the crude alcohol, which was directly used for next reaction. To a stirred solution of secondary alcohol (275 mg, 1 mmol) in DMSO (5 mL) at room temperature was added IBX (336 mg, 1.2 mmol) and the reaction mixture was stirred for 2 h. After complete consumption of the starting material (monitored by TLC), the reaction mixture was filtered through celite with the aid of EtOAc and the resulting filtrate was washed with cold $H_2O$ (10 mL×2) and brine solution (10 mL) and the organic layer was dried over anhydrous $Na_2SO_4$. Volatiles were removed under reduced pressure and the obtained crude mixture was purified by silica gel column chromatography to yield the substituted ynone (4j) prepared as pale yellowish oil (240 mg, 88%).

3-(2-Fluorophenyl)-1-(1-methyl-1H-indol-3-yl)prop-2-yn-1-one (4k): By following the general procedure 2 using 1-methyl-1H-indole-3-carbaldehyde and 2-fluoro phenylacetylene, ynone 4k was prepared as dark brown solid (202 mg, 73%).

Preparation of Chloro-Substituted Indole-Ynones of Formula II (X=Cl)

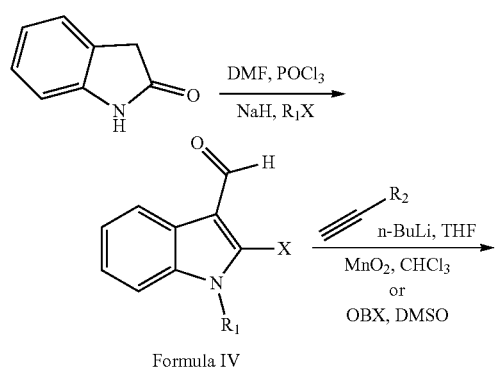

Formula IV

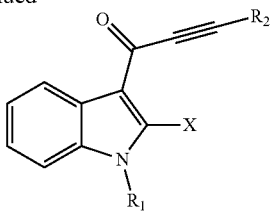

Formula II $R_1$=Me, Bn; and $R_2$=Phenyl, 4-fluorophenyl, 4-nbutyl phenyl, n-butyl, C1-C6 alkyl, or cyclopropyl The chlorosubstituted indole-ynones were synthesized starting from commercially available oxindoles as shown in scheme below. Accordingly, the oxindole was treated with DMF and $POCl_3$ following the procedure known in the prior art to furnish 2-chloro-indole-3-carbaxaldehyde which was further treated with NaH and alkyl halide to get the N-substituted chloro indole derivative of formula IV. This compound of formula IV was later treated with acetylene compounds in presence of n-Buli to get the secondary alcohol followed by oxidation with IBX (Chem. Eur. J. 2016, 22, 12655) or $MnO_2$ (Org. Lett. 2005, 7, 5203) to furnish the chloro-substituted indole-ynone of formula II following the process known in the prior art.

1-(1-Benzyl-2-chloro-1H-indol-3-yl)-3-phenylprop-2-yn-1-one (4l): By following the general procedure 2 using 1-benzyl-2-chloro indole-3-carbaldehyde and phenylacetylene, ynone 4l was prepared as brownish yellow solid (277 mg, 75%).

1-(2-Chloro-1-methyl-1H-indol-3-yl)-3-(4-fluorophenyl)prop-2-yn-1-one (4m): By following the general procedure 2 using 1-methyl-2-chloro indole-3-carbaldehyde and 4-fluoro phenylacetylene, ynone 4m was prepared as light brown solid (221 mg, 71%).

3-(4-butylphenyl)-1-(2-chloro-1-methyl-1H-indol-3-yl)prop-2-yn-1-one (4n): By following the general procedure 2 using 1-methyl-2-chloro indole-3-carbaldehyde and 4-n-butyl phenylacetylene, ynone 4n was prepared as dark brown oil (238 mg, 68%).

1-(2-Chloro-1-methyl-1H-indol-3-yl)hept-2-yn-1-one (4o): By following the general procedure 2 using 1-methyl-2-chloro indole-3-carbaldehyde and 1-hexyne 4o was prepared as pale yellowish oil (202 mg, 74%).

1-(2-Chloro-1-methyl-1H-indol-3-yl)-3-phenylprop-2-yn-1-one (4p): By following the general procedure 2 using 1-methyl-2-chloro indole-3-carbaldehyde and phenylacetylene, ynone 4p was prepared as light orange solid (211 mg, 72%).

Significance of the Work Carried Out

In view of the importance of carbazoles a new and efficient process for the preparation of carbazoles from indole-ynones and nitromethanes is presented. The indole-ynones can be easily accessible readily available commercial materials in a two-step process. The present process method synthesis of substituted carbazoles of formula I by us serves as a highly effective new method for the synthesis of several carbazoles and process for synthesis of three natural products carbazomycin A (1), calothrixin B (2) and staurosporinone (3) respectively thereof.

Advantages of the Invention

The various advantages of the present process are given below

The main advantage of the present invention is that it provides an efficient process for the preparation of substituted carbazoles from indole-ynones via benzannulation reaction.

The main advantage of the present invention is that it provides an efficient process for the preparation of nitro substituted carbazoles avoiding difficult nitration reaction on the carbazole moiety.

Another advantage of the present invention is the employment of easily available raw materials, nitro alkanes, phenyl acetylenes, for accessing indole-ynone substrates.

The duration of the Cadogan cyclization has been reduced enormously utilizing monowave synthesizer.

Further advantage of the invention is employment of mild base $Cs_2CO_3$.

Another advantage of this process involves utility of carbazoles synthesized by the developed process for the three natural product synthesis. That is 4-step synthesis for carbazomycin A, 6-step synthesis for calothrixin B and 5-step synthesis sequence for staurosporinone from the carbazoles synthesized herein.

We claim:

1. A compound selected from the group consisting of:
9-Methyl-2-phenyl-9H-carbazol-4-ol (6a);
9-Benzyl-2-phenyl-9H-carbazol-4-ol (6b);
9-Allyl-2-phenyl-9H-carbazol-4-ol (6c);
9-Methyl-2-(m-tolyl)-9H-carbazol-4-ol (6d);
2-(4-Ethylphenyl)-9-methyl-9H-carbazol-4-ol (6e);
2-(4-Methoxyphenyl)-9-methyl-9H-carbazol-4-ol (6f);
2-Butyl-9-methyl-9H-carbazol-4-ol (6g);
2-Cyclopropyl-9-methyl-9H-carbazol-4-ol (6h);
6-Methoxy-9-methyl-2-phenyl-9H-carbazol-4-ol (6i);
1,9-Dimethyl-2-phenyl-9H-carbazol-4-ol (6j);
1-Ethyl-9-methyl-2-phenyl-9H-carbazol-4-ol (6k);
Methyl 3-(4-hydroxy-9-methyl-2-phenyl-9H-carbazol-1-yl)propanoate (6l);
9-Benzyl-1,2-dimethyl-9H-carbazol-4-ol (6m);
Ethyl 4-hydroxy-9-methyl-2-phenyl-9H-carbazole-3-carboxylate (7a);
Ethyl 2-cyclopropyl-4-hydroxy-9-methyl-9H-carbazole-3-carboxylate (7b);
Ethyl 4-hydroxy-6-methoxy-9-methyl-2-phenyl-9H-carbazole-3-carboxylate (7c);
(4-hydroxy-9-methyl-2-phenyl-9H-carbazol-3-yl)(phenyl)methanone (7d);
(2-(2-fluorophenyl)-4-hydroxy-9-methyl-9H-carbazol-3-yl)(phenyl)methanone (7e);
(4-Hydroxy-6-methoxy-9-methyl-2-phenyl-9H-carbazol-3-yl)(phenyl)methanone (7f);
9-Benzyl-1-nitro-2-phenyl-9H-carbazol-4-ol (8a);
2-(4-Fluorophenyl)-9-methyl-1-nitro-9H-carbazol-4-ol (8b);
2-(4-Butylphenyl)-9-methyl-1-nitro-9H-carbazol-4-ol (8c);
2-Butyl-9-methyl-1-nitro-9H-carbazol-4-ol (8d);
Ethyl 9-benzyl-4-hydroxy-1-nitro-2-phenyl-9H-carbazole-3-carboxylate (8e);
Ethyl 2-(4-fluorophenyl)-4-hydroxy-9-methyl-1-nitro-9H-carbazole-3-carboxylate (8f);
(4-Hydroxy-9-methyl-1-nitro-2-phenyl-9H-carbazol-3-yl)(phenyl)methanone (8g);
(2-(4-Butylphenyl)-4-hydroxy-9-methyl-1-nitro-9H-carbazol-3-yl)(phenyl)methanone (8h); and
(2-Cyclopropyl-4-hydroxy-9-methyl-1-nitro-9H-carbazol-3-yl)(phenyl)methanone (8i).

* * * * *